(12) United States Patent
Soechting

(10) Patent No.: US 12,348,902 B2
(45) Date of Patent: Jul. 1, 2025

(54) MANAGING AUGMENTED PARTICIPATING USER VIDEO SOURCE INTERFACES IN ASSOCIATION WITH AN AUDIO-VIDEO CONFERENCING INTERFACE SERVICE

(71) Applicants: ATLASSIAN PTY LTD., Sydney (AU); ATLASSIAN US, INC., San Francisco, CA (US)

(72) Inventor: Dylan Soechting, Austin, TX (US)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/068,259

(22) Filed: Dec. 19, 2022

(65) Prior Publication Data

US 2024/0205369 A1 Jun. 20, 2024

(51) Int. Cl.
*G06F 21/31* (2013.01)
*H04N 7/15* (2006.01)

(52) U.S. Cl.
CPC ............ *H04N 7/157* (2013.01); *G06F 21/31* (2013.01); *G06F 2221/2111* (2013.01); *G06F 2221/2115* (2013.01)

(58) Field of Classification Search
CPC .................................................. G06F 16/9535
See application file for complete search history.

(56) References Cited

U.S. PATENT DOCUMENTS 11,184,455 B1 * 11/2021 Gonzales ............ H04L 67/1095
11,290,465 B1 * 3/2022 Lyons ...................... H04N 7/15
11,490,052 B1 * 11/2022 Ati ........................ H04L 65/1093
2014/0365396 A1 * 12/2014 Kumar .................. G06F 40/169
705/345
2015/0033297 A1 * 1/2015 Sanso .................... H04L 63/126
726/5

(Continued)

OTHER PUBLICATIONS

Businesswire, #Warmly Announces Free App for Zoom: #Warmly People Insights, Jul. 21, 2021, https://businesswire.com/news/home/20210721005351/en/Warmly-Announces-Free-App-for-Zoom-Warmly-People-Insights, Jan. 18, 2023.

*Primary Examiner* — Di Xiao
(74) *Attorney, Agent, or Firm* — Alston & Bird LLP

(57) ABSTRACT

Systems, apparatuses, and methods for managing augmented participating user video source interfaces in association with an audio-video conferencing interface service are disclosed. An example method includes monitoring an active audio-video conference presentation, identifying a participating user video source interface for each of a plurality of participating client devices, determining whether a truth source application is installed on the participating client devices, accessing a truth source account associated with the truth source application and determining a corresponding augmenting user profile data structure based on the truth source account, generating an augmented user profile exposure object based on each respective augmenting user profile data structure, and propagating each augmented user profile exposure object to the plurality of participating client devices to cause rendering of the augmented participating user video source interfaces to respective displays of the plurality of participating client devices in association with the active audio-video conference presentation.

20 Claims, 9 Drawing Sheets

(56) References Cited

U.S. PATENT DOCUMENTS

| | | | |
|---|---|---|---|
| 2018/0213057 A1* | 7/2018 | Wang | H04L 67/306 |
| 2022/0385857 A1* | 12/2022 | Ittelson | H04N 7/155 |
| 2023/0066708 A1* | 3/2023 | Han | G06Q 10/10 |
| 2023/0081717 A1* | 3/2023 | Hoang | H04L 65/1083 |

* cited by examiner

MANAGING AUGMENTED PARTICIPATING USER VIDEO SOURCE INTERFACES IN ASSOCIATION WITH AN AUDIO-VIDEO CONFERENCING INTERFACE SERVICE

BACKGROUND

Applicant has identified a number of deficiencies and problems associated with efficiently identifying and effectively surfacing pertinent information, such as disparate user profile information, among a plurality of users in existing systems that provide multi-party virtual meeting environments (e.g., audio/video conferencing systems). Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved apparatuses, methods, systems, and computer program products configured for managing augmented participating user video source interfaces in association with an active audio-video conference presentation provided by an audio-video conferencing interface service. In accordance with one exemplary embodiment of the present disclosure, a system is provided for managing augmented participating user video source interfaces in association with an audio-video conferencing interface service, the system comprising at least one processor and at least one memory, the at least one memory having computer-coded instructions therein, wherein the computer-coded instructions are configured to, in execution with the at least one processor, cause the system to monitor an active audio-video conference presentation that is configured for rendering to respective displays of a plurality of participating client devices by the audio-video conferencing interface service; identify a participating user video source interface for each of the plurality of participating client devices; for each participating client device, determine whether a truth source application is installed on the participating client device; in a circumstance where the truth source application is determined to be installed on a participating client device, access a truth source account associated with the truth source application and determine a corresponding augmenting user profile data structure based on the truth source account; generate an augmented user profile exposure object based on each respective augmenting user profile data structure; and propagate each augmented user profile exposure object to the plurality of participating client devices to cause rendering of the augmented participating user video source interfaces to respective displays of the plurality of participating client devices in association with the active audio-video conference presentation.

In some embodiments, the augmenting user profile data structure comprises one or more of a user name, an organization identifier, a team identifier, a job title identifier, a project identifier, a location identifier, or combinations thereof.

In other embodiments, determining an augmenting user profile data structure based on the truth source account comprises extracting a user profile parameter subset from the truth source account based on an augmenting user profile exposure template and dynamically instantiating the augmenting user profile exposure template with at least the extracted user profile parameter subset by programmatically mapping one or more extracted user profile parameters to one or more augmenting user profile parameter fields in the augmenting user profile exposure template, thereby determining the augmenting user profile data structure. In certain embodiments, wherein each participating client device is associated with a corresponding participating user identifier and wherein the computer-coded instructions are further configured to, in execution with the at least one processor, cause the system to for each participating user identifier, retrieve an augmenting user profile exposure template set; cause display of an augmenting user profile exposure template selection interface to the participating client device associated with the corresponding participating user identifier, wherein the augmenting user profile exposure template selection interface comprises a rendered listing of available augmenting user profile exposure templates in the augmenting user profile exposure template set, and wherein each available augmenting user profile exposure template in the rendered listing is configured to be selectable; and receive an augmenting user profile exposure template selection request from the participating client device associated with the participating user identifier. In still further embodiments, wherein the augmenting user profile exposure template set is retrieved from an internal augmenting source user profile data structure associated with the participating user identifier.

In some embodiments, the computer-coded instructions are further configured to, in execution with the at least one processor, cause the system to retrieve the augmenting user profile exposure template based on an organization identifier associated with the corresponding participating user identifier wherein each participating client device is associated with a corresponding participating user identifier. In further embodiments, the computer-coded instructions are further configured to, in execution with the at least one processor, cause the system to programmatically identify and retrieve the augmenting user profile exposure template based on an analysis of the participating user identifiers wherein each participating client device is associated with a corresponding participating user identifier. In certain embodiments, at least one of the participating user identifiers is associated with an organization identifier that differs from another organization identifier of another participating user identifier such that an external facing augmenting user profile exposure template is programmatically identified. In other embodiments, each of the participating user identifiers is associated with a same organization identifier such that an internal facing augmenting user profile exposure template is programmatically identified.

In some embodiments, the truth source account comprises an established communication channel with at least one external augmenting source user profile repository that is hosted by an external resource such that it is associated with a third-party controlled system. In further embodiments, establishing the communication channel between the truth source account and the external augmenting source user profile repository comprises generating an authentication request based on user-provided credentials associated with the participating user identifier, the truth source account comprising the user-provided credentials; transmitting the authentication request to the third-party controlled system; and receiving an authentication response from the third-party controlled system, wherein in an instance the authentication response comprises an authentication approval, retrieving an augmenting source user profile data structure associated with the participating user identifier from the external augmenting source user profile repository, and wherein in an instance the authentication response comprises an authentication disapproval or an authentication error, transmitting an authentication error notification object to the participating client device associated with the participating user identifier to cause rendering of an authentication error notification to the display of the corresponding participating client device. In other embodiments, the truth source application is communicably coupled to an organization personnel onboarding repository. In certain other embodiments, the truth source application is configured to apply a conflict protocol to identify an accurate user profile parameter subset in an instance wherein the external augmenting source user profile repository comprises potentially conflicting user profile parameter data as compared to user profile parameter data of the organization personnel onboarding repository. In some further embodiments, applying the conflict protocol comprises automatically identifying the user profile parameter data of the organization personnel onboarding repository source application as the accurate user profile parameter subset. In other embodiments, applying the conflict protocol comprises identifying the user profile parameter data associated with the most recent timestamp as the accurate user profile parameter subset. In still further embodiments, applying the conflict protocol comprises propagating a modal to the participating client device associated with the truth source account, the modal requesting a selection from the user to identify an accurate user profile parameter subset.

In some embodiments, the truth source application comprises a real time location identifier, the real time location identifier based on GPS location data of the corresponding participating client device. In some further embodiments, the augmenting user profile data structure comprises the real time location identifier such that the augmented participating user video source interface comprises a real time location of the corresponding participating client device.

In some embodiments, the augmenting user profile data structure comprises the real time location identifier such that the augmented participating user video source interface renders a real time location of the corresponding participating client device.

In accordance with another exemplary embodiment of the present disclosure, a computer-implemented method is provided for managing augmented participating user video source interfaces in association with an audio-video conferencing interface service, the method comprising: monitoring an active audio-video conference presentation that is configured for rendering to respective displays of a plurality of participating client devices by the audio-video conferencing interface service; identifying a participating user video source interface for each of the plurality of participating client devices; for each participating client device, determining whether a truth source application is installed on the participating client device; in a circumstance where the truth source application is determined to be installed on a participating client device, accessing a truth source account associated with the truth source application and determining a corresponding augmenting user profile data structure based on the truth source account; generating an augmented user profile exposure object based on each respective augmenting user profile data structure; and propagating each augmented user profile exposure object to the plurality of participating client devices to cause rendering of the augmented participating user video source interfaces to respective displays of the plurality of participating client devices in association with the active audio-video conference presentation.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
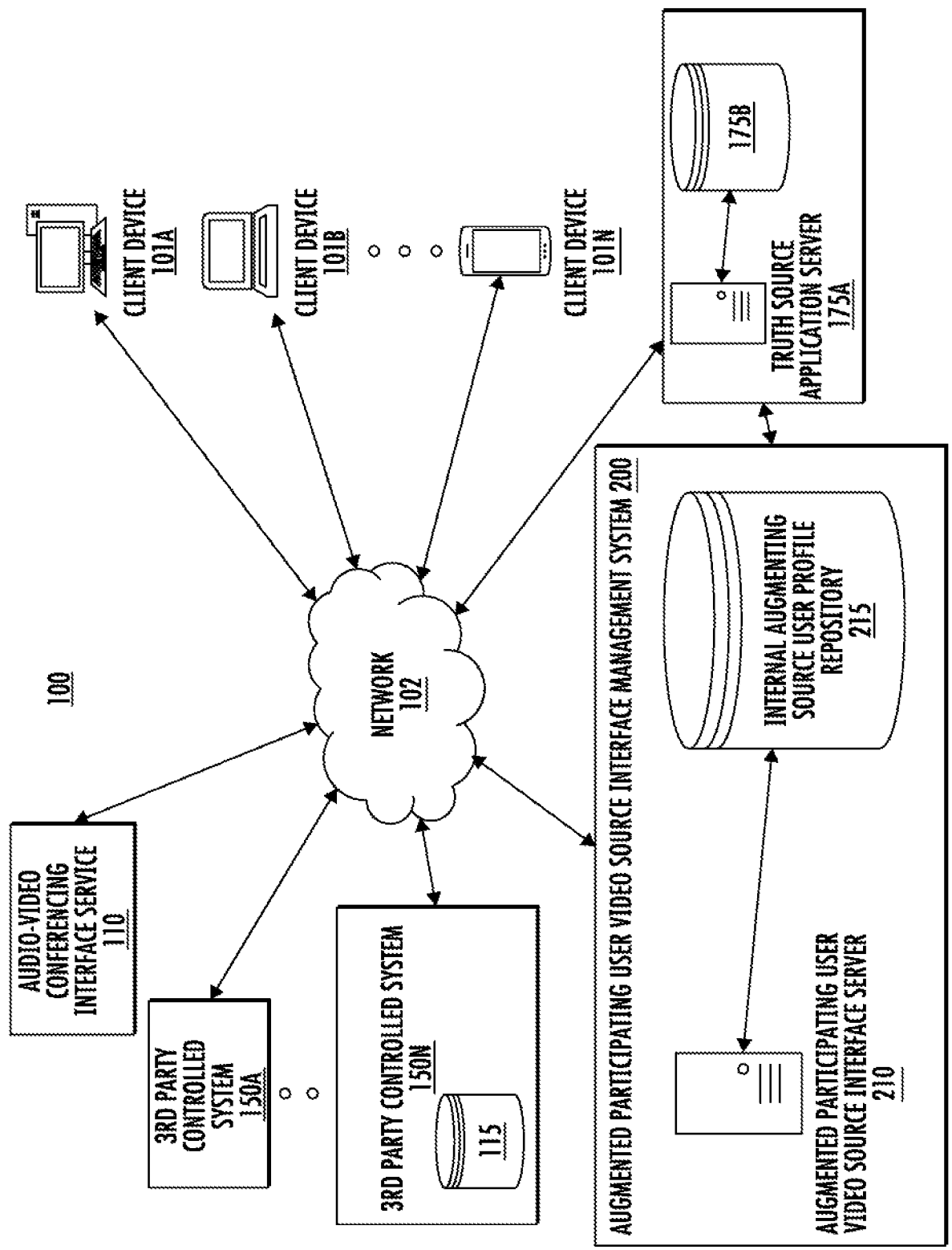
Figure 2:
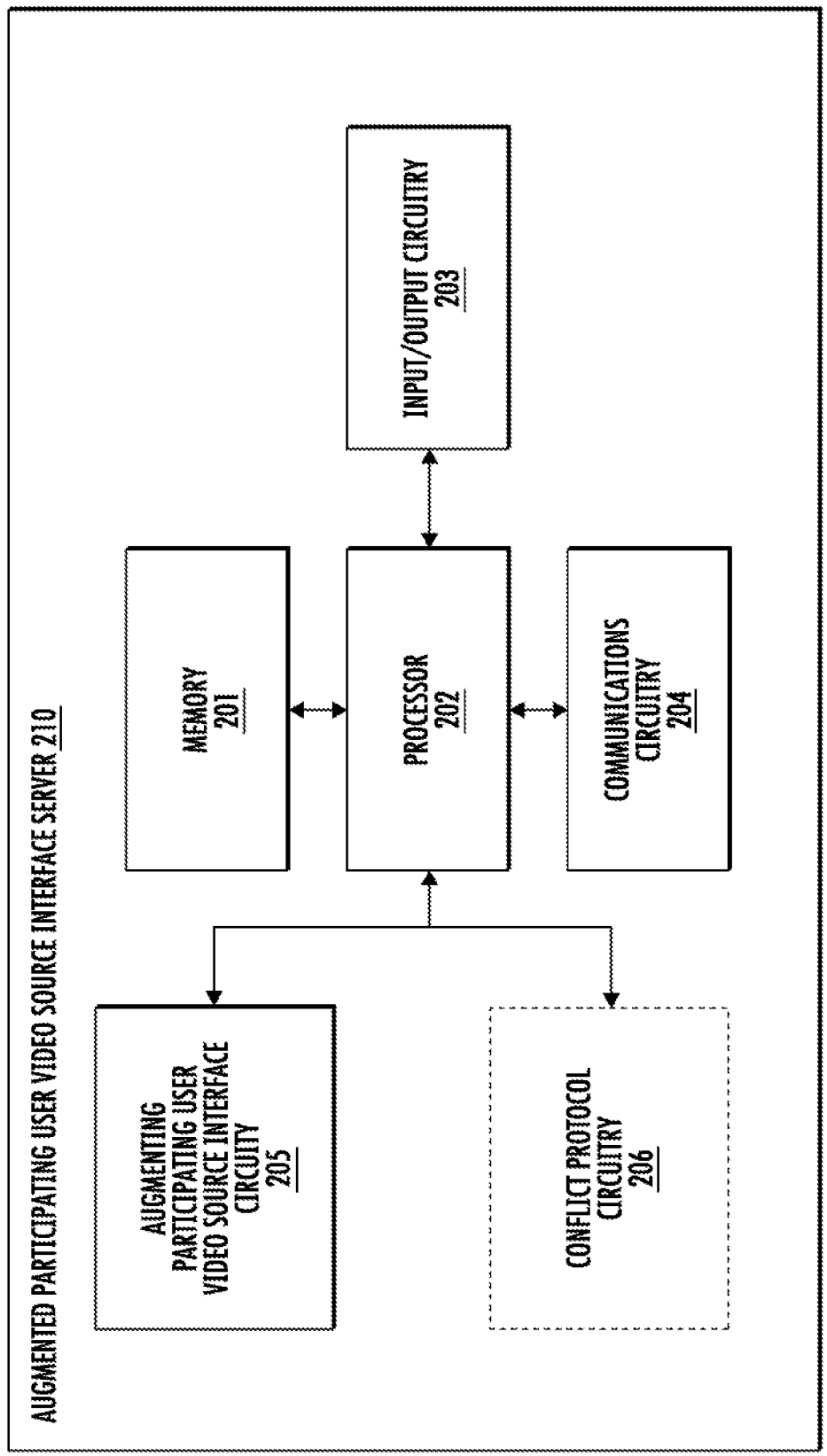
Figure 3:
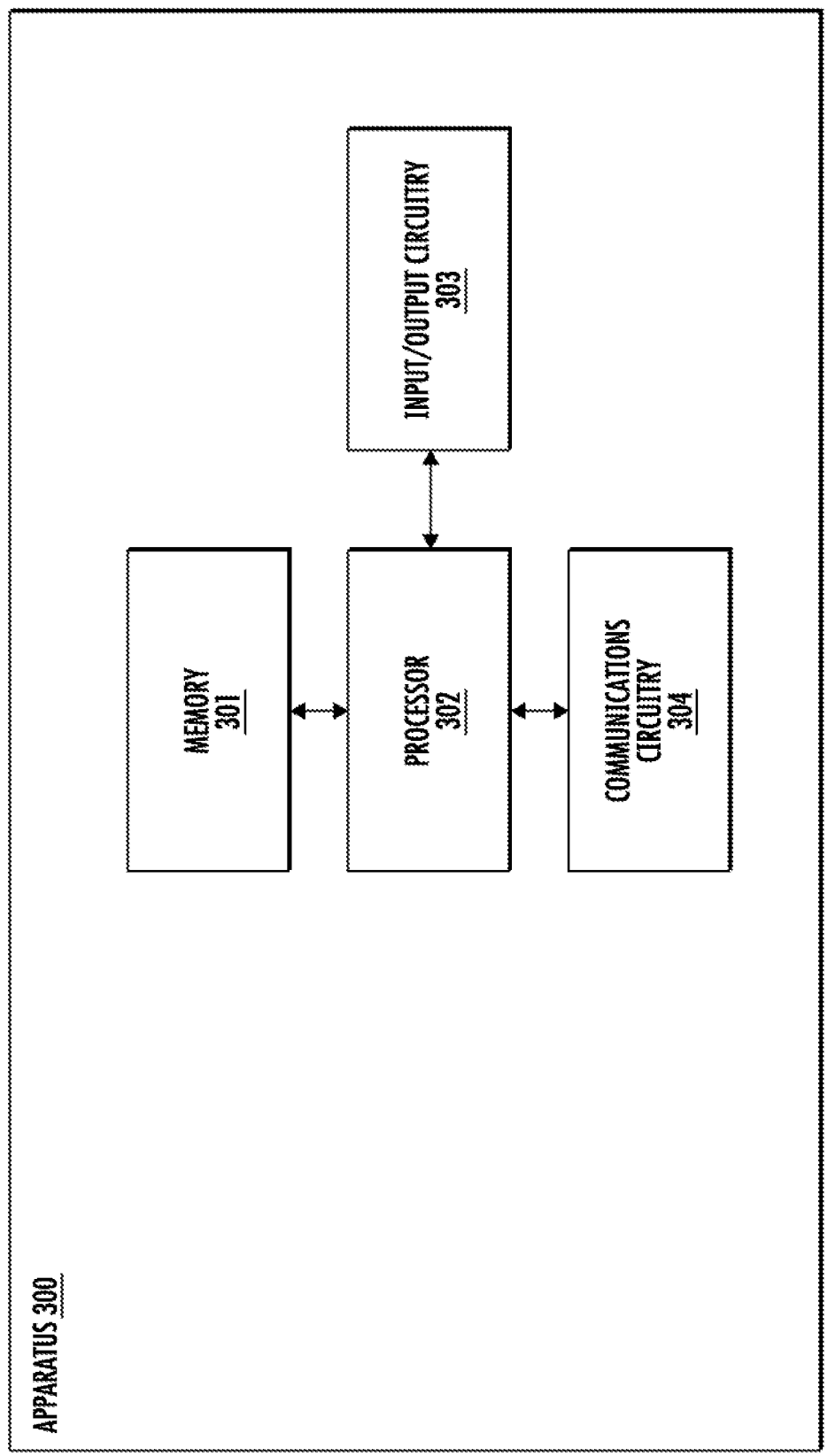
Figure 4:
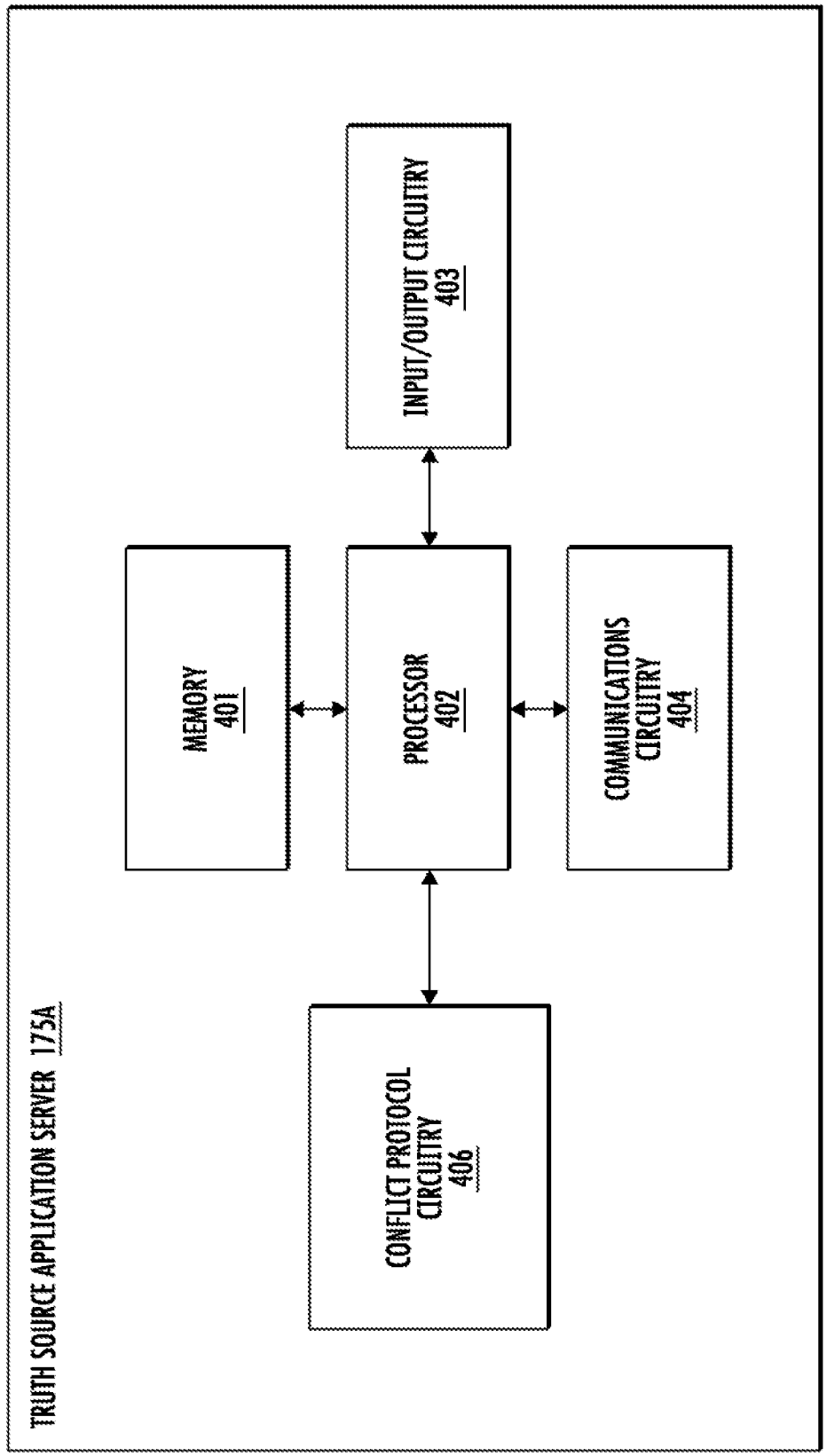
Figure 5:
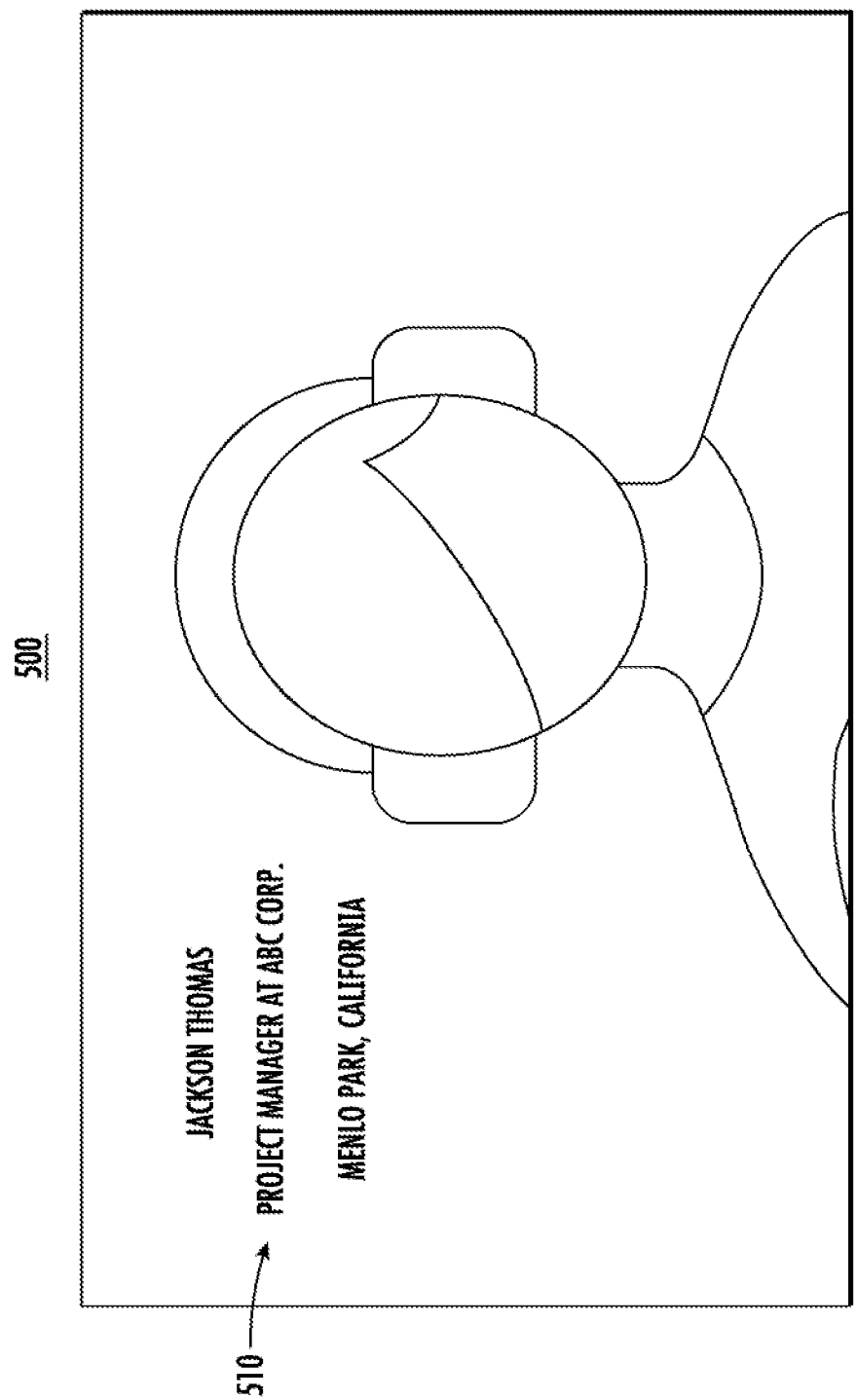
Figure 6A:
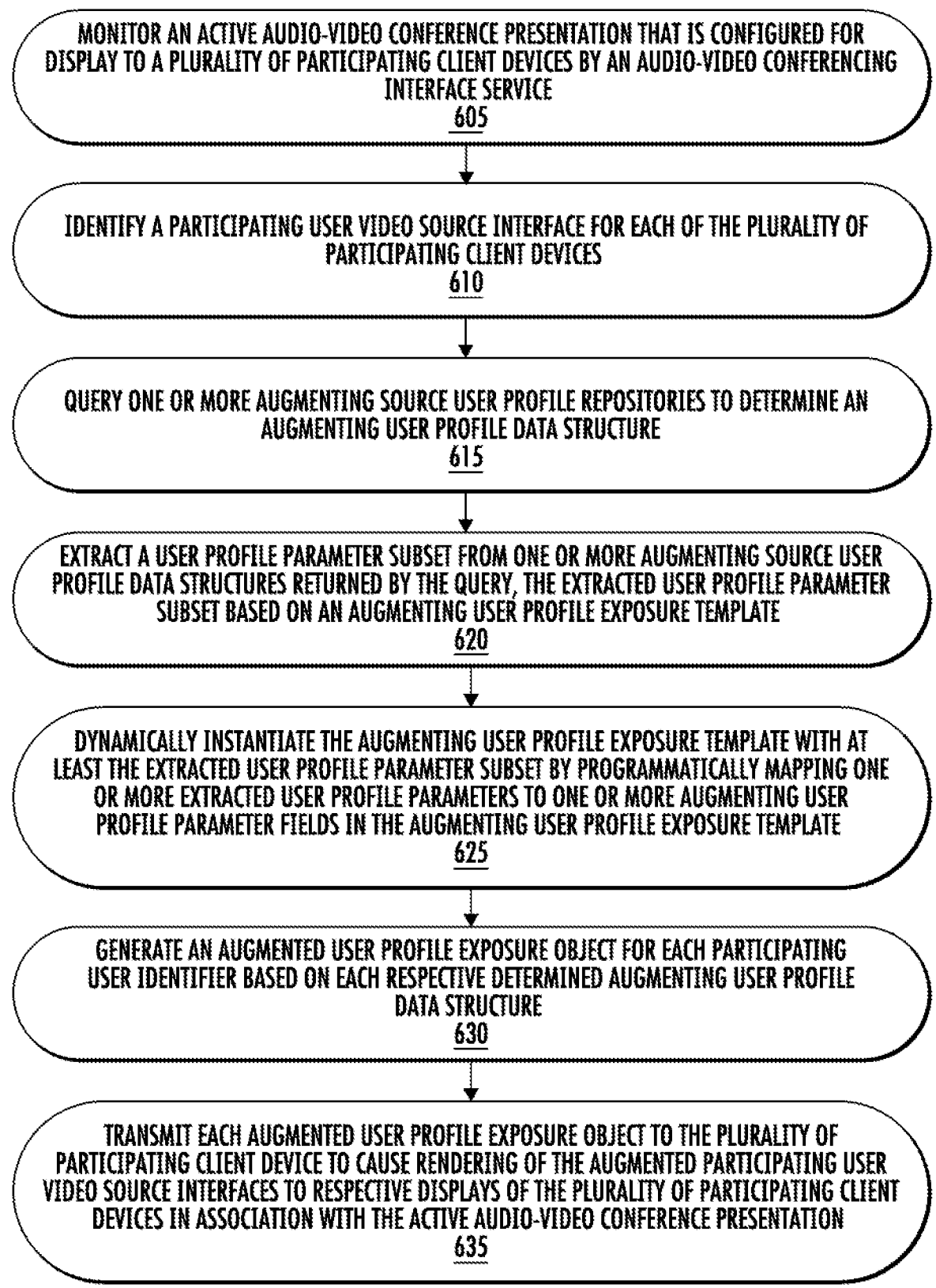
Figure 6B:
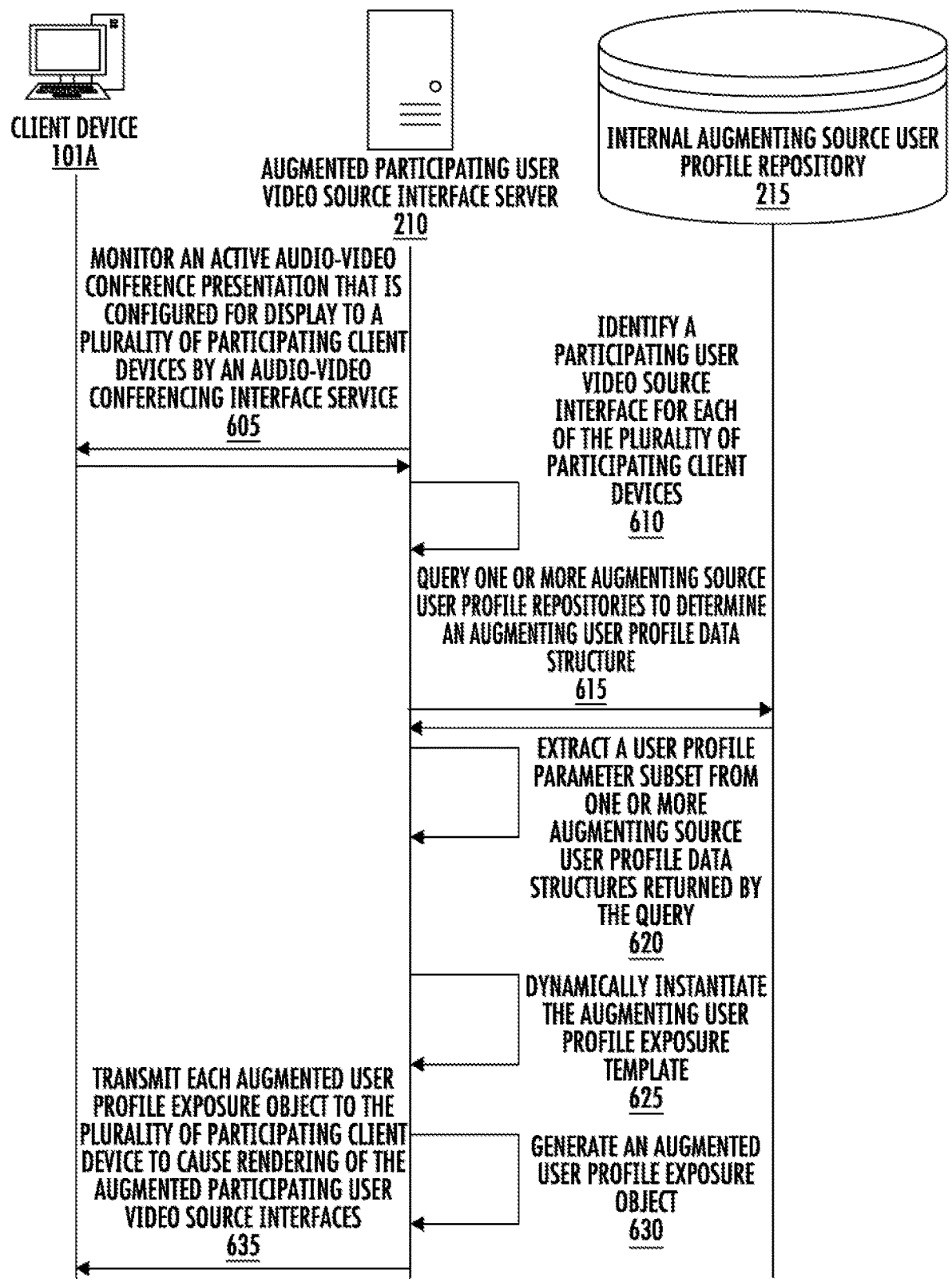
Figure 7:
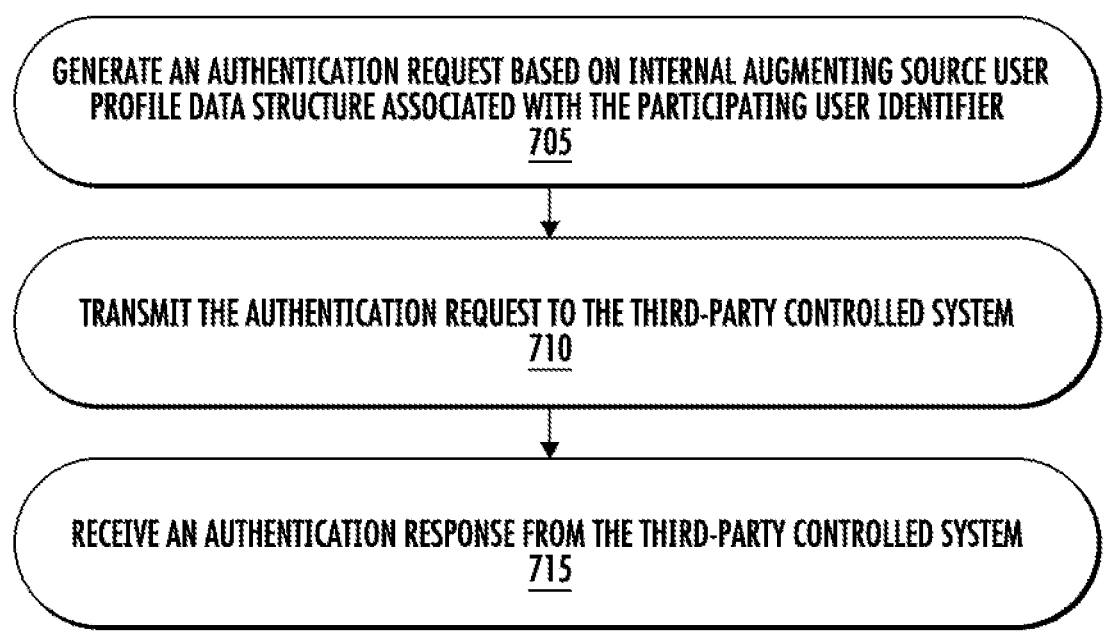
Figure 8:
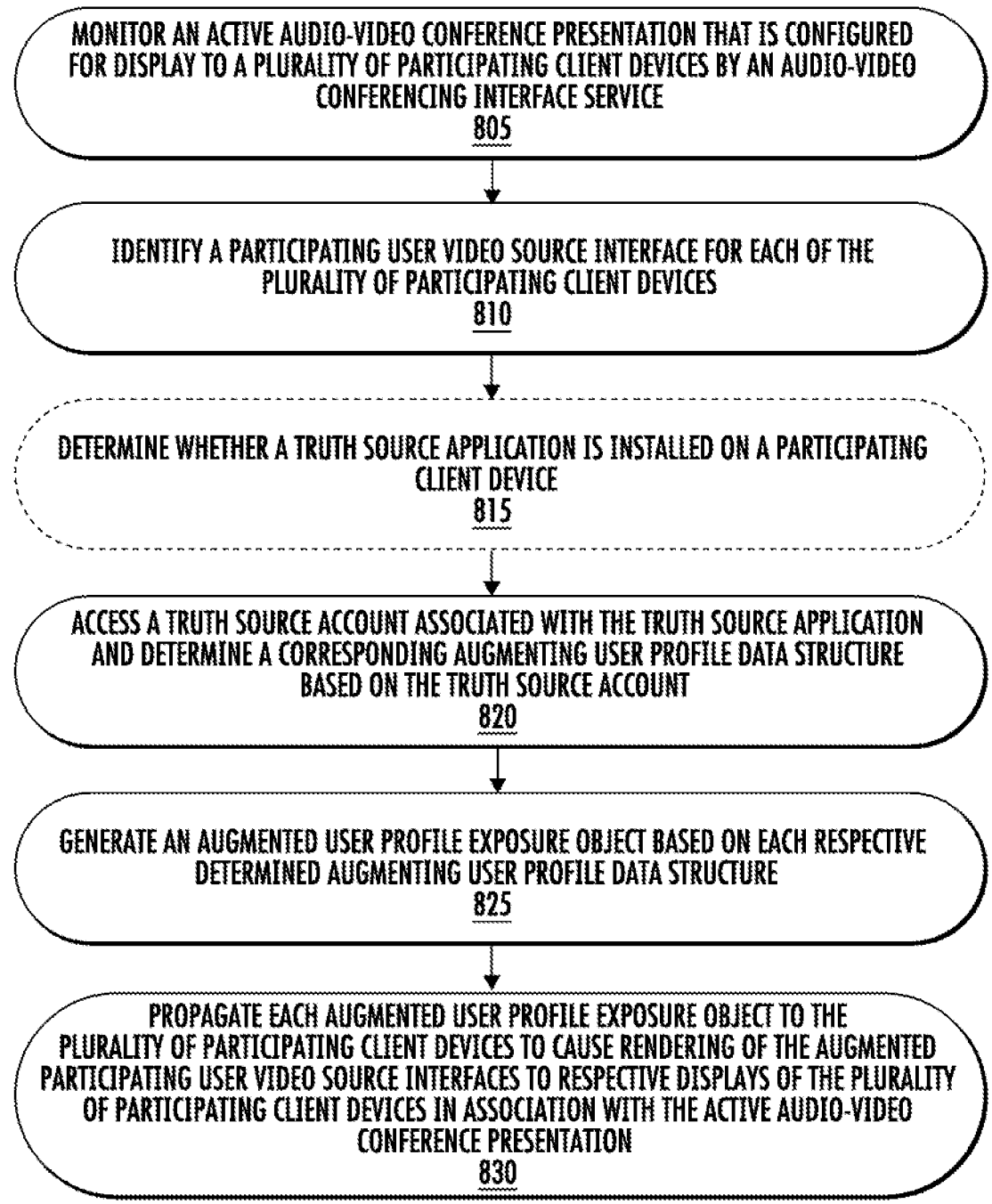

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example augmented participating user video source interface management system configured to communicate with an audio-video conferencing interface service and two or more client devices in accordance with some example embodiments described herein;

FIG. 2 is a schematic block diagram of example circuitry for use in an augmenting participating user video source interface server in accordance with some example embodiments described herein;

FIG. 3 is a schematic block diagram of example circuitry for use in a participating client device in accordance with some example embodiments described herein;

FIG. 4 is a schematic block diagram of example circuitry for use in a truth source application server in accordance with some example embodiments described herein;

FIG. 5 illustrates an example augmented participating user video source interface structured in accordance with some example embodiments described herein;

FIG. 6A is a flowchart illustrating example operations for managing an augmented participating user video source interface in accordance with various aspects and embodiments of the subject disclosure;

FIG. 6B is a signal diagram of an example data flow in accordance with various aspects and embodiments of the subject disclosure;

FIG. 7 is a flowchart illustrating example operations for querying at least one external augmenting source user profile repository in accordance with various aspects and embodiments of the subject disclosure; and FIG. 8 is a flowchart illustrating example operations for managing an augmented participating user video source interface via a truth source application in accordance with various aspects and embodiments of the subject disclosure.

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to an example "apparatus." However, elements of the apparatus described herein may be equally applicable to the claimed system, method, and computer program product. Accordingly, use of any such terms should not be taken to limit the spirit and scope of embodiments of the present disclosure.

Overview

Individuals and organizations routinely use audio-video conferencing services (e.g., Zoom®, GoToMeeting®, BlueJeans®, Webex®, Teams®, Google Meet®, or the like) to allow geographically-dispersed users to remotely communicate and collaborate within and across organizations using individual computing devices (e.g., laptops, desktops, smart phones, servers, and/or the like). The volume of audio-video conference presentations that users must attend in a day, week, or month has also exploded as more presentations and meetings are moved to the virtual space. When users are participating in such a high volume of virtual audio-video conference presentations, it is difficult to keep up to date on profile information regarding all participants, such as name, nickname, job title, company, location, time zone, project(s), and the like. There are also a variety of sources of information from which such information can originate—an internal directory, Slack®, LinkedIn®, Confluence®, and the like. Such multiple source further raises the issue of potentially conflicting and/or outdated information. For example, a user's Slack® account may indicate they are located in Menlo Park but their LinkedIn® account may indicate they are located in Mountainview. It is undesirable to require participants to manually search for all of this information, especially since various sources may have conflicting information. It is also undesirable to require participants to manually provide this information. Accordingly, the inventor has determined it would be desirable and advantageous to augment, supplement, highlight, or otherwise emphasize certain participating user content in a contextually relevant manner in association with augmented participating user video source interfaces for an active audio-video conference presentation (e.g., Zoom® meeting) among a plurality of users.

Various embodiments of the present disclosure provide apparatuses, systems, computer-implemented methods, and computer program products for managing augmented participating user video source interfaces in association with an audio-video conferencing interface service. Some such embodiments enhance meeting communication methods by reducing miscommunication, ensuring participant alignment, increasing meeting productivity, and otherwise reducing time and cost expenditures incurred in culling and disseminating participant information for the meeting.

These characteristics as well as additional features, functions, and details are described below. Similarly, corresponding and additional embodiments are also described below. The various implementations of the augmented participating user video source interface and truth source application of the present disclosure are not limited to an audio-video conferencing interface service and can instead be configured to cull and display a wide variety of data characteristics for any set of data that might be of interest to a user. The augmented participating user video source interface may be used to visualize any set of data for any purpose and it may be used in connection with numerous exemplary system architectures as explained in further detail herein. One of ordinary skill in the art will appreciate that the augmented participating user video source interface related concepts discussed herein may be applied to better visualize characteristics of interest for a wide variety of data.

Definitions

As used herein, the term "audio-video conferencing interface service" refers to an application, program, platform, and/or service configured for providing virtual video and/or audio conferencing (e.g., active audio-video conference presentation), webinars, live chats, streaming services, screen-sharing, and other real-time collaborative audio and/or video capabilities configured for display to a plurality of participating client devices. Non-limiting examples of an audio-video conferencing interface service include Zoom®, BlueJeans®, Webex®, Teams®, Google Meet®, and the like.

In some embodiments, an audio-video conferencing interface service is hosted by an "external resource" such that it is associated with a third-party controlled system and is configured for authenticated communication with an augmented participating user video source interface management system to provide audio-video conferencing functionality to participating client devices. An external resource provides functionality not provided natively by the augmented participating user video source interface management system. The external resource operates on a compiled code base or repository that is separate and distinct from that which supports the augmented participating user video source interface management system. In some embodiments, the external resource may communicate with the augmented participating user video source interface management system, and vice versa, through one or more application program interfaces (APIs). Additionally or alternatively, in some embodiments, an audio-video conferencing interface service is hosted by the augmented participating user video source interface management system.

In some embodiments, an audio-video conferencing interface service generates, manages and/or maintains one or more participating user video source interfaces associated with an active audio-video conference presentation, each participating user video source interface configured for receiving and rendering a video source feed associated with a respective participating client device of the active audio-video conference presentation. In some embodiments, a participating user video source interface does not receive and/or is unable to render a video source feed such that the participating user video source interface is blank and/or does not include a live video source feed.

The term "augmented participating user video source interface management system" refers to a software platform and associated hardware that is configured to support, maintain, and manage augmenting interface data associated with augmenting, supplementing, highlighting, or otherwise emphasizing certain participating user content in association with augmented participating user video source interfaces associated with an active audio-video conference presentation. In some embodiments, the augmented participating user video source interface management system, or a portion thereof, is at least partially configured to operate as a portion (e.g., plug-in, add-on, extension, etc.) of an audio-video conferencing interface service. In some embodiments, the augmented participating user video source interface management system, or a portion thereof, is configured to operate on compiled code bases or repositories that are separate and distinct (e.g., a standalone augmenting participating user video source interface server or other computing device) from the audio-video conferencing interface service and/or one or more client devices associated with one or more users. Example augmented participating user video source interface management systems comprise supporting server(s), repositor(ies), and client device(s), and in some embodiments, are further configured to engage with external resource(s) and external application(s).

The term "augmenting participating user video source interface server" refers to a software platform and associated hardware that is configured to generate, maintain, and/or manage augmented participating user video source interface(s) in association with an audio-video conferencing interface service. The augmenting participating user video source interface server is accessible via one or more computing devices and is configured to monitor active audio-video conference presentation(s), identify participating user video source interface(s), query and/or access one or more data repositories (such as internal or external augmenting source user profile repositories), determine whether a truth source application is installed on participating client device(s), query and/or access truth source account(s) associated with the truth source application, determine augmenting user profile data structure(s), generate augmented user profile exposure object(s), and/or propagate and/or transmit such augmented user profile exposure objects to cause rendering of augmented participating user video source interface(s). The functionality of the augmenting participating user video source interface server may be provided via a single server or a collection of servers having a common functionality, or the functionality of the augmenting participating user video source interface server may be segmented among a plurality of servers or collections of servers performing subsets of the described functionality of the augmenting participating user video source interface server, such as in a cloud networking environment.

The term "augmenting source user profile repository" refers to a structured data set or computing location, such as a database stored on a memory device, which is accessible by one or more computing devices for retrieval and storage of user profile data and other data associated with augmenting source user profile data structures. For example, the augmenting source user profile repository includes one or more user profile data structure(s) comprising one or more user profile parameters such as user name(s), user identifier(s), organization identifier(s), team identifier(s), job title identifier(s), project identifier(s), location identifier(s), augmenting user profile exposure template(s), username(s) and/or password(s) or other user credentials or authenticating identifier(s), and/or the like. The augmenting source user profile repository may be a dedicated device and/or a part of a larger repository. The augmenting source user profile repository may be dynamically updated or be static. In some embodiments, the augmenting source user profile repository is encrypted in order to limit unauthorized access of such user profile data.

In some embodiments, an augmenting source user profile repository is an internal augmenting source user profile repository comprising one or more internal augmenting source user profile data structures such that it stores data that is generated based on user input, user selections, and user interaction with the augmented participating user video source interface management system. Additionally or alternatively, an augmenting source user profile repository is an external augmenting source user profile repository that is hosted by an external resource such that it is associated with a third-party controlled system and stores data that is generated based on user input, user selections, and user interaction with such third-party controlled system. User profile data can be queried and/or retrieved from such internal augmenting source user profile repositories and/or external augmenting source user profile repositories (e.g., in some embodiments, may require authentication or authorization to access) by the augmenting participating user video source interface server.

The term "truth source application" refers to one or more software applications that provides access to a truth source account associated with the user of the corresponding client device. In some embodiments, the truth source application refers to a directory service that is communicably coupled (e.g., via an API or similar interface mechanism) to the augmented participating user video source interface management system (e.g., an augmented participating user video source interface management application). In certain embodiments, such a directory service need not be installed on a client device and/or require a client-side user interface. In other embodiments, the truth source application refers to one or more software applications configured for execution by or on a client device such that it may be specifically designed to be executed within a specific computing environment associated with a computing device of a user, and is configured to provide access to functionality of a truth service account. A non-limiting example of a truth source application refers to an "app" installed to and/or executing via a mobile device. In some embodiments, the truth source application may include hardware, software, or combinations thereof operating remotely (e.g., on a server) from the mobile device to provide the functionality of the truth source application.

In some embodiments, the truth source application is populated with and/or communicably coupled to an organization's employee onboarding application (e.g., such as an HR application, Salesforce®, and/or the like). In some embodiments, the truth source application is a "smart" or "intelligent" application that serves as a definitive source of truth for user profile information for one or a plurality of other services, applications, or systems, such as, but not limited to, the augmented participating user video source interface management system. In some embodiments, an employee of an organization may be associated with, registered with, and/or assigned a "truth source account" for use with the truth source application upon onboarding (e.g., or at any time in an employee's relationship with the organization), the truth source account being populated with, among other data, user profile information associated with the employee. The truth source account may be populated with and/or provided access to user profile information from one or more of the organization's employee onboarding application(s), such that the truth source application may serve as a definitive source of truth of such user profile information. In some embodiments, the truth source application may have a communication channel established with one or more external services to which the user (e.g., employee) and/or the organization (e.g., employer) provides access, such as LinkedIn®, Slack®, Teams®, or the like.

The term "third-party controlled system" refers to one or more computing devices embodied in hardware, software, firmware, and/or a combination thereof, operated by and/or otherwise controlled by a third-party entity (e.g., a business or an organization) or an agent thereof for purposes of supporting one or more actions performed by the third-party entity.

The terms "data," "content," "digital content," "digital content object," "data structure," "signal", "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "user profile data" refers to a collection of data associated with a user and/or user profile that is capable of being transmitted, received, and/or stored in an augmented participating user video source interface management system. In some embodiments, user profile data comprises data associated with a user which defines and/or identifies the user within an augmented participating user video source interface management system. For example, user profile data may comprise one or more of a user identifier, user data, user profile parameters, user name(s), organization identifier(s), team identifier(s), job title identifier(s), project identifier(s), location identifier(s), real time location identifier(s), augmenting user profile exposure template(s), username(s) and/or password(s) or other user credentials or authenticating identifier(s), and/or the like. The user profile data can include a subset designation of user credentials, such as, for example, login information for the user for the augmented participating user video source interface management system and/or an external, third-party controlled system, including the user's username and password.

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user for the selected active audio-video conference presentation to the audio-video conferencing interface service and/or to the augmented participating user video source interface management system (e.g., augmenting participating user video source interface server).

A "participating client device" of an active audio-video conference presentation refers to a client device associated with a user identifier identified as disposed in a real-time communicative relation with the live stream presentation of the active audio-video conference presentation.

The term "participating user video source interface" refers to a graphical user interface or sub-user interface comprising a presentation of the corresponding video source feed originating from a participating user (e.g., participating client device) in association with an audio-video conferencing interface service (e.g., active audio-video conference presentation). In some embodiments, the active audio-video conference presentation comprises the display of a plurality of participating user exposure interfaces, each participating user exposure interface associated with a participating user (e.g., participating client device) in communication with the active audio-video conference presentation. In still further embodiments, the plurality of participating user video source interfaces are caused to be rendered to the respective displays of the plurality of participating client devices associated with the active audio-video conference presentation by the audio-video conferencing interface service. For example, in some embodiments, a participating user video source interface is rendered to a participating client device based on data and instructions provided by the audio-video conferencing interface service. That is, in some embodiments, the visual presentation, rendering, or display of the participating user video source interface is controlled by the audio-video conferencing interface service and transmitted to the plurality of participating client devices. In some embodiments, such data and instructions are facilitated by a dedicated software application running on the client device. In other embodiments, such data and instructions are provided through a web browser running on the client device. In some embodiments, an augmented participating user video source interface management system (e.g., augmenting participating user video source interface server) monitors an active audio-video conference presentation that is configured for rendering to respective displays of the plurality of participating client devices by the audio-video conferencing interface service and generates augmented user profile exposure object(s) for causing rendering of respective augmented participating user video source interfaces in accordance with various embodiments described herein.

The term "augmenting source user profile data structure" refers to a collection and/or compilation of user profile data capable of being collectively transmitted, received, and/or stored and from which an augmenting user profile data structure is generated and/or determined. For instance, an augmenting source user profile data structure is a centralized collection of data elements stored and/or used by an augmented participating user video source interface management system for generating an augmenting user profile data structure. In some embodiments, an augmenting source user profile data structure is an internal augmenting source user profile data structure such that it is stored in an internal augmenting source user profile repository hosted by the augmented participating user video source interface management system. In some embodiments, an augmenting source user profile data structure is an external augmenting source user profile data structure such that it is stored in an external augmenting source user profile repository that is hosted by an external resource such that it is associated with a third-party controlled system. In some embodiments, access to one or more external augmenting source user profile data structures (e.g., external augmenting source user profile repository) requires an authentication process. In various embodiments, augmenting source user profile data structures comprise data elements that include one or more of a user name, an organization identifier, a team identifier, a job title identifier, a project identifier, a location identifier, or combinations thereof.

The term "augmenting user profile data structure" refers to a collection and/or compilation of user profile data capable of being collectively transmitted, received, and/or stored. For instance, an augmenting user profile data structure is a centralized collection of data elements stored and/or used by an augmented participating user video source interface management system for generating an augmented user profile exposure object. In some embodiments, a plurality of data elements forming the collection of such data elements are defined by an augmenting user profile exposure template. In various embodiments, each of the plurality of data elements (e.g., user profile parameter subset) are culled and extracted from a truth source account associated with a truth source application installed on a participating client device. Additionally or alternatively, in various embodiments, each of the plurality of data elements (e.g., user profile parameter subset) are culled and extracted from one or more augmenting source user profile data structures returned by a query of one or more augmenting source user profile repositories, such query and culled data elements based on an augmenting user profile exposure template associated with the participating user identifier. In certain embodiments, such culling and extracting comprises determining a primary data element to include in the augmenting user profile data structure in instances of conflicting and/or disparate data sources. In various embodiments, augmenting user profile data structures comprise data elements that include one or more of a user name, an organization identifier, a team identifier, a job title identifier, a project identifier, a location identifier, or combinations thereof. In some embodiments, an augmenting user profile data structure can be stored in a data repository (e.g., internal augmenting source user profile repository).

The term "augmented user profile exposure object" refers to an overlay visual representation generated by an augmented participating user video source interface management system (e.g., augmenting participating user video source interface server) based on an augmenting user profile data structure. In some embodiments, the augmented user profile exposure object associated with a participating user identifier is transmitted to and/or propagated to each of the plurality of participating client devices associated with an active audio-video conference presentation in order to cause rendering of an augmented participating user video source interface, the augmented participating user video source interface comprising the augmented user profile exposure object rendered as an overlay visual representation in association with a participating user video source interface. In some embodiments, an augmented user profile exposure object is configured to visually convey, emphasize, depict, or otherwise display certain user profile data and/or personalized information associated with a participating user identifier in association with a participating user video source interface in an active audio-video conference presentation.

For example, in some embodiments, an augmented user profile exposure object visually conveys (e.g., as part of an augmented participating user video source interface) one or more items of information about a participating user by modifying the display of the original video source feed of the corresponding participating user video source interface associated with the participating user. To provide context, in a non-limiting illustrative example, the augmenting participating user video source interface server modifies the display of the background in the original video source feed of a participating user video source interfaces such that a virtual business card of the user from which the original video source feed originates, is displayed. Examples of types information that can be modified, edited, and/or otherwise displayed in such overlay visual representations include, but are not limited to, an icon, text (e.g., coloring scheme, highlighting, bolding, italicized, enlarged, shaded, flashing, pulsing, or changing in size, etc.), and/or background(s) displayed in a graphical user interface (e.g., augmented participating user video source interface). Examples of information that can be modified, edited, and/or otherwise displayed in such overlay visual representations include, but are not limited to, such as a user name, an organization title, a team name, a job title, a project name, a user location, personalized information, and/or combinations thereof.

The term "augmented participating user video source interface" refers to a graphical user interface or sub-user interface comprising an augmented presentation of a corresponding participating user video source interface in association with an active audio-video conference presentation. In some embodiments, the augmented participating user video source interface is caused to be rendered to one or more respective visual displays of a plurality of participating client devices associated with the active audio-video conference presentation and is specially configured to enable the plurality of participating users associated with the active audio-video conference presentation to view, access, and/or identify highlighted and/or emphasized information associated with the corresponding participating user identifier during the active audio-video conference presentation, enabling each participating user to view a continuing display of the augmented content of the participating user video source interfaces forming the active audio-video conference presentation.

An augmented participating user video source interface is rendered to a participating client device based on data and instructions provided by the augmented participating user video source interface management system (e.g., augmenting participating user video source interface server), such as via an augmented user profile exposure object. That is, in some embodiments, the visual presentation, rendering, or display of the augmented participating user video source interface is based on an augmented user profile exposure object generated by an augmented participating user video source interface management system (e.g., augmenting participating user video source interface server) and transmitted to the plurality of participating client devices. In some embodiments, such data and instructions are facilitated by a dedicated software application running on the client device. In other embodiments, such data and instructions are provided through a web browser running on the client device.

"Augmenting user profile exposure template" should be understood to refer to the format, layout, organization, structure, arrangement, and/or selection of content, profile parameters, and/or information (e.g., user identifer(s), organization identifer(s), user profile parameter personalization field, and the like) used to determine an augmenting user profile data structure in an augmented participating user video source interface management system. As such, the augmenting user profile exposure template comprises a plurality of augmenting user profile parameter fields to define the selected user profile data, including the structure and/or organization of such selected user profile data, in order to determine the augmenting user profile data structure. For example, in some embodiments, one or more user profile parameters (e.g., a user profile parameter subset) are extracted from one or more augmenting source user profile data structures based on an augmenting user profile exposure template and used to dynamically instantiate the augmenting user profile exposure template to determine the augmenting user profile data structure.

In still further embodiments, each augmenting user profile exposure template is associated with a unique augmenting user profile exposure template identifier. An augmenting user profile exposure template identifier is one or more items of data by which an augmenting user profile exposure template is uniquely identified in the augmented participating user video source interface management system. For example, a user may have multiple, different augmenting user profile exposure templates associated with a user identifier, each augmenting user profile exposure template associated with a unique augmenting user profile exposure template identifier.

In some embodiments, the apparatus dynamically instantiates an augmenting user profile exposure template with user profile data (e.g., user profile parameter subset) to determine the augmenting user profile data structure. For example, in certain embodiments, the augmenting user profile exposure template comprises augmenting user profile parameter fields and the apparatus programmatically maps user profile data and/or a user profile parameter subset to one or more particular augmenting user profile parameter fields in the augmenting user profile exposure template to determine the augmenting user profile data structure. In some embodiments, the object page interface template is associated with a participating user identifier such that the augmenting user profile exposure template is user-specific. For example, in some embodiments, the specific configuration of an augmenting user profile exposure template associated with a first participating user identifier differs from the configuration of an augmenting user profile exposure template associated with a second participating user identifier. In certain embodiments, an augmenting user profile exposure template is associated with an organization identifiers such that the augmenting user profile exposure template is organization-specific. For example, in some embodiments, an organization may define one or more augmenting user profile exposure templates to be associated with its organization identifier and such augmenting user profile exposure templates are then associated with a particular participating user identifier in an instance when such organization identifier is associated with the particular participating user identifier. Additionally or alternatively, a team and/or project may define one or more augmenting user profile exposure templates to be associated with its team identifier and/or project identifier and such augmenting user profile exposure templates are then associated with a particular participating user identifier in an instance when such team identifier and/or project identifier is associated with the particular participating user identifier.

The term "augmenting user profile exposure template selection interface" refers to a user interface element that is rendered to a display of a participating client device in association with an augmented participating user video source interface management system and which is configured to enable a user to view and interact with the interface in order to select one or more augmenting user profile exposure templates in order to determine an augmenting user profile data structure. In some embodiments, the augmenting user profile exposure template selection interface comprises a rendered listing of available augmenting user profile exposure templates for selection by the user.

The term "augmenting user profile exposure template selection request" refers to an electrically generated digital object created by a computing device upon user engagement with an augmenting user profile exposure template selection interface that indicates that a user has provided an input comprising a selected augmenting user profile exposure template for determining an augmenting user profile data structure. An augmenting user profile exposure template selection request may be represented via a temporary code that notifies a recipient (e.g., a server) that a user has made the request (e.g., selection). To provide further context, an augmenting user profile exposure template selection request is generated in response to a user interaction with a computing device, for example, with an augmenting user profile exposure template selection interface, wherein a user causes the computing device to generate an augmenting user profile exposure template selection request by interacting with, for example, a selectable link comprising and/or associated with the selected augmenting user profile exposure template. Additionally or alternatively, an augmenting user profile exposure template selection request is generated in response to a user interaction indicating selection of an augmenting user profile exposure template from a dropdown menu or an actuator button associated with the selected augmenting user profile exposure template, the actuator button rendered on a visual display of the computing device.

The term "participant listing object" refers to one or more electronically managed data representing the identification of the participating user identifiers associated with participating user video source interfaces (e.g., meeting users who are present) identified in an active audio-video conference presentation monitored by the augmented participating user video source interface management system (e.g., augmenting participating user video source interface server).

The term "participating user exposure interface" refers to a user interface element that is rendered to a display of a participating client device in association with an augmented participating user video source interface management system, the participating user exposure interface comprising a visual representation of a listing of the participating users associated with the active audio-video conference presentation based on a participant listing object.

The term "personalization augmentation interface" refers to a user interface element that is rendered to a display of a participating client device in association with an augmented participating user video source interface management system and which is configured to enable a user to view and interact with the interface in order to select, identify, manage, and/or otherwise configure one or more personalized user profile parameters in order to determine an augmenting user profile data structure.

The term "personalization augmentation selection request" refers to an electrically generated digital object created by a computing device upon user engagement with a personalization augmentation interface that indicates that a user has provided an input comprising a selection, identification, and/or configuration of one or more personalized user profile parameters in the determination of the augmenting user profile data structure. A personalization augmentation selection request may be represented via a temporary code that notifies a recipient (e.g., a server) that a user has made the request. To provide further context, a personalization augmentation selection request is generated in response to a user interaction with a computing device, for example, with a personalization augmentation interface, wherein a user causes the computing device to generate a personalization augmentation selection request by interacting with (e.g., personalizing and/or configuring), for example, a user profile parameter. In some embodiments, a personalization augmentation selection request further comprises a participating user identifier associated with the personalization augmentation selection request.

The terms "configured background request" and "update configured background request" refer to electrically generated digital objects that are created by or otherwise originate from a computing device associated with a participating user identifier requesting definition, modification, selection, and/or or otherwise configuration of a background parameter with respect to the rendering of the visible background of the participating user video source interface associated with such participating user identifier. In this regard, a "configured background request" and/or "update configured background request" causes initiation of a process that may culminate in rendering of an updated augmented participating user video source interface associated with the corresponding participating user identifier to the respective displays of the plurality of participating client devices in association with the active audio-video conference presentation. In some embodiments, a "configured background request" and/or "update configured background request" is represented via a temporary code that is generated by and/or transmitted from a computing device (e.g., based on user interaction with a participating client device) to a management system (e.g., augmented participating user video source interface management system) as an indication that the participating client device has made the request. In some embodiments, the "configured background request" or "update configured background request" is associated with a variety of metadata such as one or more of a user identifier (e.g., participating user identifier), a background parameter, and/or other data for use in generating, managing, and/or otherwise supporting an augmented participating user video source interface management system as described herein.

The term "user identifier" refers to one or more items of data by which a user may be identified within an augmented participating user video source interface management system. For example, a user identifier may comprise text string(s), numerical character(s), alphabetical character(s), alphanumeric code(s), ASCII character(s), a pointer, an IP address, a MAC address, a memory address, other unique identifier, or a combination thereof. "Participating user identifier" refers to a user identifier defining a user associated with a participating client device of an active audio-video conference presentation.

The term "organization identifier" refers to one or more items of data by which an organization may be identified within an augmented participating user video source interface management system. For example, an organization identifier may comprise text string(s), numerical character(s), alphabetical character(s), alphanumeric code(s), ASCII character(s), a pointer, an IP address, a MAC address, a memory address, other unique identifier, or a combination thereof.

The term "team identifier" refers to one or more items of data by which a team may be identified within an augmented participating user video source interface management system. For example, a team identifier may comprise text string(s), numerical character(s), alphabetical character(s), alphanumeric code(s), ASCII character(s), a pointer, an IP address, a MAC address, a memory address, other unique identifier, or a combination thereof.

The term "project identifier" refers to one or more items of data by which a project may be identified within an augmented participating user video source interface management system. For example, a project identifier may comprise text string(s), numerical character(s), alphabetical character(s), alphanumeric code(s), ASCII character(s), a pointer, an IP address, a MAC address, a memory address, other unique identifier, or a combination thereof.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architecture

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example augmented participating user video source interface management system 200 configured to communicate with an audio-video conferencing interface service 110, one or more third-party controlled systems 150A-150N, a truth source application system 175, and/or two or more client devices 101A-101N in accordance with some example embodiments described herein. Users may access an augmented participating user video source interface management system 200 via a communications network 102 using one or more of client devices 101A-101N. Augmented participating user video source interface management system 200 may comprise an augmenting participating user video source interface server 210 in communication with at least one repository, such as internal augmenting source user profile repository 215 or external augmenting source user profile repository 115. Such repository(ies) may be hosted by the augmenting participating user video source interface server 210 or otherwise hosted by devices or systems in communication with the augmenting participating user video source interface server 210, such as a third-party controlled system 150N. The augmented participating user video source interface management system 200 is, in some embodiments, able to manage augmented participating user video source interfaces in association with an audio-video conferencing interface service 110, as will be described below.

Augmenting participating user video source interface server 210 may include circuitry, networked processors, or the like configured to perform some or all of the augmenting participating user video source interface server-based processes described herein (e.g., monitor an active audio-video conference presentation, identify participating user video source interface(s), query and/or access one or more data repositories (such as internal or external augmenting source user profile repositories), determine whether a truth source application is installed on participating client device(s), query and/or access truth source account(s) associated with the truth source application, determine augmenting user profile data structure(s), generate augmented user profile exposure object(s), and/or propagate and/or transmit such augmented user profile exposure objects to cause rendering of augmented participating user video source interface(s) to client devices 101A-101N, using data from, for example, internal augmenting source user profile repository 215, external augmenting source user profile repositories 115A-115N, and/or truth source application/truth source account), and may be any suitable network server and/or other type of processing device. For example, in various embodiments, the augmenting participating user video source interface server 210 may process various data structures (e.g., augmenting source user profile data structures) comprising user profile data retrieved from various augmenting source user profile repositories, such as internal augmenting source user profile repository 215 and/or external augmenting source user profile repositories 115A-115N hosted by third-party systems 150A-150N. In various other embodiments, the augmenting participating user video source interface server 210 may process various data structures (e.g., augmenting source user profile data structures) comprising user profile data retrieved from a truth source account hosted by truth source application system 250. In this regard, the augmenting participating user video source interface server 210 may be embodied by any of a variety of devices, for example, the augmenting participating user video source interface server 210 may be embodied as a computer or a plurality of computers. For example, augmenting participating user video source interface server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith.

In some embodiments, augmenting participating user video source interface server 210 may be located remotely from the augmenting source user profile repositories 115, 215, although in other embodiments, the augmenting participating user video source interface server 210 may comprise an augmenting source user profile repository (e.g., internal augmenting source user profile repository 215). The augmenting participating user video source interface server 210 may, in some embodiments, comprise several servers or computing devices performing interconnected and/or distributed functions. Despite the many arrangements contemplated herein, augmenting participating user video source interface server 210 is shown and described herein as a single computing device to avoid unnecessarily overcomplicating the disclosure.

Augmenting participating user video source interface server 210 can communicate with one or more client devices 101A-101N, one or more third-party controlled systems 150A-150N, a truth source application system 175, and/or an audio-video conferencing interface service 110 via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the augmented participating user video source interface management system 200.

Internal augmenting source user profile repository 215 may be stored by any suitable storage device configured to store some or all of the information described herein (e.g., memory 201 of the augmenting participating user video source interface server 210 or a separate memory system separate from the augmenting participating user video source interface server 210, such as one or more database systems, backend data servers, network databases, cloud storage devices, or the like provided by another device (e.g., online application or 3rd party provider), such as a Network Attached Storage (NAS) device or devices, or as a separate database server or servers). Internal augmenting source user profile repository 215 may comprise data received from the augmenting participating user video source interface server 210 (e.g., via a memory 201 and/or processor(s) 202) and/or a client device 101A-101N, and the corresponding storage device may thus store this data. Internal augmenting source user profile repository 215 includes information accessed and stored by the augmenting participating user video source interface server 210 to facilitate the operations of the augmented participating user video source interface management system 200. As such, internal augmenting source user profile repository 215 may include, for example, without limitation, user identifier(s), participating user identifier(s), user name, organization identifier(s), team identifier(s), job title identifier(s), project identifier(s), location identifier(s), augmenting source user profile data structure(s) (e.g., internal augmenting source user profile data structure(s)), user credentials, and/or the like.

In various embodiments, the one or more third-party controlled systems 150A-150N in electronic communication with the augmented participating user video source interface management system 200 may be a software program, application, platform, or service that is provided by way of a remote device, such as a server or processing device, maintained by a third-party individual, company, or organization, and which is configured to communicate with the augmented participating user video source interface management system 200. That is, a third-party controlled system 150 operates on compiled code base or repository that is separate and distinct from that which supports the augmented participating user video source interface management system 200. In various embodiments, a third-party controlled system 150 system may communicate with the augmented participating user video source interface management system 200, and vice versa, through one or more application program interfaces (APIs). In some embodiments, the third-party controlled system 150 may receive tokens or other authentication credentials that are used to facilitate secure communication between the third-party controlled system 150 and the augmented participating user video source interface management system 200 in view of verification and/or authentication protocols (e.g., network firewall protocols).

External augmenting source user profile repositories 115A-115N may be stored by any suitable storage device configured to store some or all of the information described herein (e.g., a separate memory system separate from the augmenting participating user video source interface server 210, such as one or more database systems, backend data servers, network databases, cloud storage devices, or the like provided by another device or third-party controlled system 150 (e.g., online application or 3rd party provider), such as a Network Attached Storage (NAS) device or devices, or as a separate database server or servers). In some embodiments, external augmenting source user profile repository 115 includes information accessed by the augmenting participating user video source interface server 210 to facilitate the operations of the augmented participating user video source interface management system 200. As such, external augmenting source user profile repository 115 may include, for example, without limitation, user identifier(s), participating user identifier(s), user name, organization identifier(s), team identifier(s), job title identifier(s), project identifier(s), location identifier(s), augmenting source user profile data structure(s) (e.g., external augmenting source user profile data structure(s)), user credentials, and/or the like.

Audio-video conferencing interface service 110 may be any application, program, platform, and/or service configured for providing virtual video and/or audio conferencing (e.g., active audio-video conference presentation), webinars, live chats, streaming services, screen-sharing, and other real-time collaborative audio and/or video capabilities configured for display to a plurality of participating client devices. As depicted in FIG. 1, in some embodiments, an audio-video conferencing interface service 110 is hosted by an "external resource" such that it is associated with a third-party controlled system 150 and is configured for authenticated communication with the augmented participating user video source interface management system 200 to provide audio-video conferencing functionality to participating client devices 101A-101N. In such embodiment, the audio-video conferencing interface service 110 operates on a compiled code base or repository that is separate and distinct from that which supports the augmented participating user video source interface management system 200. In some embodiments, the audio-video conferencing interface service 110 may communicate with the augmented participating user video source interface management system 200, and vice versa, through one or more application program interfaces (APIs). Although not depicted in FIG. 1, in some embodiments, the audio-video conferencing interface service 110 is hosted by the augmented participating user video source interface management system 200.

In some embodiments, an audio-video conferencing interface service generates, manages and/or maintains one or more participating user video source interfaces associated with an active audio-video conference presentation, each participating user video source interface configured for receiving and rendering a video source feed associated with a respective participating client device of the active audio-video conference presentation. In some embodiments, a participating user video source interface does not receive and/or is unable to render a video source feed such that the participating user video source interface is blank and/or does not include a live video source feed.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101-101N). Electronic data received by the augmenting participating user video source interface server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting augmented participating user video source interfaces to a user and otherwise providing access to the augmented participating user video source interface management system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one augmented participating user video source interface, which may be provided by the third-party controlled system 200.

In embodiments where a client device 101A-101N is a mobile device, such as a smartphone or tablet, the client device 101A-101N may execute an "app" to interact with the augmented participating user video source interface management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system.

Additionally, or alternatively, the client device 101A-101N may interact with the augmented participating user video source interface management system 200 via a web browser. As yet another example, the client devices 101A-101N may include various hardware or firmware designed to interface with the augmented participating user video source interface management system 200. Example embodiments contemplated herein may have various form factors and designs but will nevertheless include at least the components illustrated in FIG. 3 and described in connection therewith.

The augmented participating user video source interface management system 200 (e.g., augmented participating user video source interface server 210) includes or is associated with a truth source application system 175, embodying the truth source application. As depicted, the truth source application system 175 includes a truth source application server 175A and a truth source application data repository 175B. In some embodiments, the truth source application data repository 175B includes one or more computing device(s), database(s), and/or the like, configured to store data and/or data objects utilized for providing truth source application functionality. For example, in some embodiments, the truth source application data repository 175B includes one or more memory devices configured to store at least truth source account(s), user profile data, information associated with and/or links between user profile data object(s). In some embodiments, the truth source application server 175A is configured to store data to the truth source application data repository 175B that is processed by the truth source application server 175A for providing the truth source application functionality. Additionally or alternatively, in some embodiments, the truth source application server 175A is configured to retrieve data from the truth source application data repository 1750B for use in providing the truth source application functionality.

Example Apparatuses for Implementing Embodiments of the Present Disclosure

FIG. 2 shows a schematic block diagram of example circuitry, some or all of which may be included in an augmenting participating user video source interface server 210. In accordance with some example embodiments, augmenting participating user video source interface server 210 may include various means, such as memory 201, processor 202, input/output circuitry 203, and/or communications circuitry 204. Moreover, in some embodiments, augmenting participating user video source interface circuitry 205 and/or conflict protocol circuitry 206 may also or instead be included in the augmenting participating user video source interface server 210. For example, where augmenting participating user video source interface circuitry 205 is included in augmenting participating user video source interface server 210, augmenting participating user video source interface circuitry 205 may be configured to facilitate the functionality discussed herein regarding monitoring active audio-video conference presentation(s), identifying participating user video source interface(s), determining whether a truth source application is installed on participating client device(s), querying and/or accessing truth source account(s) associated with a truth source application, determining augmenting user profile data structure(s), generating augmented user profile exposure object(s), and/or propagating and/or transmitting augmented user profile exposure object(s) to cause rendering of augmented participating user video source interfaces to client devices. For example, where conflict protocol circuitry 206 is included in augmenting participating user video source interface server 210, conflict protocol circuitry 206 may be configured to facilitate the functionality discussed herein regarding identifying an accurate user profile parameter subset. An apparatus, such as augmenting participating user video source interface server 210, may be configured, using one or more of the circuitry 201, 202, 203, 204, 205, and/or 206, to execute the operations described above with respect to FIG. 1 and below in connection with FIGS. 6-8.

Although the use of the term "circuitry" as used herein with respect to components 201-206 are described in some cases using functional language, it should be understood that the particular implementations necessarily include the use of particular hardware configured to perform the functions associated with the respective circuitry as described herein. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the augmenting participating user video source interface server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the augmenting participating user video source interface server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, augmenting participating user video source interface server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, applications, instructions, or the like, for enabling an apparatus, e.g., augmenting participating user video source interface server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling augmenting participating user video source interface server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by augmenting participating user video source interface server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as augmenting participating user video source interface server 210. The plurality of processors may be in operative communication with each other and may be collectively configured to perform one or more functionalities of augmenting participating user video source interface server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause augmenting participating user video source interface server 210 to perform one or more of the functionalities of augmenting participating user video source interface server 210 as described herein.

In some embodiments, augmenting participating user video source interface server 210 further includes input/output circuitry 203 that may, in turn, be in communication with processor 202 to provide an audible, visual, mechanical, or other output and/or, in some embodiments, to receive an indication of an input from a user, a client device 101A-101N, audio-video conferencing interface service 110, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced as compared to embodiments where augmenting participating user video source interface server 210 may be implemented as an end-user machine or other type of device designed for complex user interactions. In some embodiments (like other components discussed herein), input/output circuitry 203 may even be eliminated from augmenting participating user video source interface server 210. Input/output circuitry 203 may be in communication with memory 201, communications circuitry 204, and/or any other component(s), such as via a bus. Although more than one input/output circuitry and/or other component can be included in augmenting participating user video source interface server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with augmenting participating user video source interface server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by augmenting participating user video source interface server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of augmenting participating user video source interface server 210, such as via a bus.

In some embodiments, augmenting participating user video source interface circuitry 205 may also or instead be included and configured to perform the functionality discussed herein related to managing augmented participating user video source interfaces, such as monitoring active audio-video conference presentation(s), identifying participating user video source interface(s), determining whether a truth source application is installed on participating client device(s), querying and/or accessing truth source account(s) associated with a truth source application, determining augmenting user profile data structure(s), generating augmented user profile exposure object(s), and/or propagating and/or transmitting augmented user profile exposure object(s) to cause rendering of augmented participating user video source interfaces to client devices. In some embodiments, augmenting participating user video source interface circuitry 205 includes hardware, software, firmware, and/or a combination of such components, configured to support various aspects of such augmenting participating user video source interface-related functionality, features, and/or services of the augmenting participating user video source interface server 210 as described herein. It should be appreciated that in some embodiments, augmenting participating user video source interface circuitry 205 performs one or more of such exemplary actions in combination with another set of circuitry of the augmenting participating user video source interface server 210, such as one or more of memory 201, processor 202, input/output circuitry 203, and communications circuitry 204. For example, in some embodiments, augmenting participating user video source interface circuitry 205 utilizes processing circuitry, such as the processor 202 and/or the like, to perform one or more of its corresponding operations. In some instances, the augmenting participating user video source interface circuitry 205 may generate an initial interface that is subsequently modified by updated augmenting user profile data structures, updated configured background requests, and/or the like. In a further example, in some embodiments, some or all of the functionality of augmenting participating user video source interface circuitry 205 may be performed by processor 202. In this regard, some or all of the example processes and algorithms discussed herein can be performed by at least one processor 202 and/or augmenting participating user video source interface circuitry 205. It should also be appreciated that, in some embodiments, augmenting participating user video source interface circuitry 205 may include a separate processor, specially configured field programmable gate array (FPGA), or application specific interface circuit (ASIC) to perform its corresponding functions.

Additionally or alternatively, in some embodiments, augmenting participating user video source interface circuitry 205 utilizes memory 201 to store collected information. For example, in some implementations, augmenting participating user video source interface circuitry 205 includes hardware, software, firmware, and/or a combination thereof, that interacts with internal augmenting source user profile repository 215 and/or memory 201 to send, retrieve, update, and/or store data values embodied by and/or associated with internal augmenting source user profile data structure(s), user profile data, user profile parameter(s), user identifier(s), organization identifier(s), team identifier(s), project identifier(s), and associated data that is configured to support the operations of the augmenting participating user video source interface circuitry 205 and the remaining circuitry. Additionally or alternatively, in some embodiments, augmenting participating user video source interface circuitry 205 utilizes input/output circuitry 203 to facilitate user output (e.g., causing rendering of one or more user interface(s) such as an augmented participating user video source interface), and/or to receive user input (e.g., user clicks, user taps, keyboard interactions, user gesture, and/or the like). Additionally or alternatively still, in some embodiments, the augmenting participating user video source interface circuitry 205 utilizes communications circuitry 204 to initiate transmissions to another computing device, receive transmissions from another computing device, communicate signals between the various sets of circuitry as depicted, and/or the like.

In some embodiments, conflict protocol circuitry 206 may also or instead be included and configured to perform the functionality discussed herein related identifying a potential conflict, applying a conflict protocol, and identifying an accurate user profile parameter subset. In some embodiments, conflict protocol circuitry 206 includes hardware, software, firmware, and/or a combination of such components, configured to support various aspects of such conflict protocol-related functionality, features, and/or services of the augmenting participating user video source interface server 210 as described herein. It should be appreciated that in some embodiments, conflict protocol circuitry 206 performs one or more of such exemplary actions in combination with another set of circuitry of the augmenting participating user video source interface server 210, such as one or more of memory 201, processor 202, input/output circuitry 203, and communications circuitry 204. In a further example, in some embodiments, some or all of the functionality of conflict protocol circuitry 206 may be performed by processor 202. In this regard, some or all of the example processes and algorithms discussed herein can be performed by at least one processor 202 and/or conflict protocol circuitry 206. It should also be appreciated that, in some embodiments, conflict protocol circuitry 206 may include a separate processor, specially configured field programmable gate array (FPGA), or application specific interface circuit (ASIC) to perform its corresponding functions.

Accordingly, non-transitory computer readable storage media can be configured to store firmware, one or more application programs, and/or other software, which include instructions and/or other computer-readable program code portions that can be executed to control processors of the components of augmenting participating user video source interface server 210 to implement various operations, including the examples shown herein. As such, a series of computer-readable program code portions may be embodied in one or more computer program products and can be used, with a device, augmenting participating user video source interface server 210, database, and/or other programmable apparatus, to produce the machine-implemented processes discussed herein. It is also noted that all or some of the information discussed herein can be based on data that is received, generated and/or maintained by one or more components of the augmenting participating user video source interface server 210. In some embodiments, one or more external systems (such as a remote cloud computing and/or data storage system) may also be leveraged to provide at least some of the functionality discussed herein. For example, in some embodiments, augmenting participating user video source interface server 210 may query one or more external augmenting source user profile repositories 115 hosted by third-party controlled systems 150 and retrieve selected user profile data from one or more external augmenting source user profile repositories in determination of an augmenting user profile data structure.

Referring now to FIG. 3, the client devices (e.g., client device 101A-101N) or the like, may be embodied by one or more computing systems, such as apparatus 300 shown in FIG. 3. FIG. 3 is a schematic block diagram showing example circuitry, some or all of which may be included in an example apparatus 300, configured to enable a user to access the augmented participating user video source interface management system 200 and/or the audio-video conferencing interface service 110 in accordance with certain embodiments of the present disclosure. For example, in some embodiments, the apparatus 300 embodies a client device 101A-101N and is configured to enable a user to interact with the audio-video conferencing interface service 110 to access an active audio-video conference presentation that is configured for display to participating client devices and/or the augmented participating user video source interface management system 200 to capture and/or review selected content.

In accordance with some example embodiments, apparatus 300 may include various means, such as memory 301, processor 302, input/output circuitry 303, and/or communications circuitry 304. Apparatus 300, such as a client device 101A-101N, may be configured, using one or more of the circuitry 301, 302, 303, and 304, to execute the operations described above with respect to FIG. 1 and below in connection with FIGS. 6-8.

In some embodiments, apparatus 300 communicates with augmented participating user video source interface management system 200 (for example, embodied by the augmenting participating user video source interface server 210 as depicted and described with respect to FIG. 2). It should be appreciated that, in some embodiments, an augmented participating user video source interface management system 200 communicates with any number of apparatus(es) 300. It should be appreciated that the components 301-304 may be embodied similar to that of the similarly named components described with respect to FIG. 2. For purposes of brevity and length of disclosure, duplicate description of such functionality is omitted. Nevertheless, these device elements, operating together, provide the respective apparatuses with the functionality necessary to facilitate the communication of data (e.g., user profile data, augmenting user profile exposure template selection request(s), personalization augmentation selection request(s), update configured background request(s), user identifier(s), organization identifier(s), team identifier(s), project identifier(s), and/or the like) for managing augmented participating user video source interfaces. That is, the apparatus 300, in some embodiments, is configured, using one or more sets of circuitry 301, 302, 303, and/or 304, to execute the operations described herein.

Referring now to FIG. 4, the truth source application server 175A, may be embodied by one or more computing systems, such as apparatus 400 shown in FIG. 4. FIG. 4 is a schematic block diagram showing example circuitry, some or all of which may be included in an example apparatus 400, configured to provide access to a source of truth of user profile data in accordance with certain embodiments of the present disclosure. In accordance with some example embodiments, apparatus 400 may include various means, such as memory 401, processor 402, input/output circuitry 403, and/or communications circuitry 404. Moreover, in some embodiments, conflict protocol circuitry 406 may also or instead be included in the truth source application server 175A. Apparatus 400, such as a server, may be configured, using one or more of the circuitry 301, 302, 303, 304, and/or 306 to execute the operations described above with respect to FIG. 1 and below in connection with FIGS. 6-8.

In some embodiments, apparatus 400 communicates with augmented participating user video source interface management system 200 (for example, embodied by the augmenting participating user video source interface server 210 as depicted and described with respect to FIG. 2). It should be appreciated that, in some embodiments, an augmented participating user video source interface management system 200 communicates with any number of apparatus(es) 400. It should be appreciated that the components 401-404 and/or 406 may be embodied similar to that of the similarly named components described with respect to FIG. 2. For purposes of brevity and length of disclosure, duplicate description of such functionality is omitted. Nevertheless, these device elements, operating together, provide the respective apparatuses with the functionality necessary to facilitate the communication of data (e.g., user profile data, augmenting user profile exposure template selection request(s), personalization augmentation selection request(s), update configured background request(s), user identifier(s), organization identifier(s), team identifier(s), project identifier(s), and/or the like) for managing augmented participating user video source interfaces. That is, the apparatus 400, in some embodiments, is configured, using one or more sets of circuitry 401, 402, 403, 404, and/or 406, to execute the operations described herein related to the truth source application.

As described above and as will be appreciated based on this disclosure, embodiments of the present disclosure may be configured as systems, methods, apparatuses, computing devices, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of augmenting participating user video source interface server 210 and client devices 101A-101N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device (e.g., as a result of the user interaction with an admin device) can be received from the client device (e.g., client device or admin device) at the server.

Example Operations for Managing Augmented Participating User Video Source Interfaces In various embodiments of the present disclosure, an apparatus (e.g., augmenting participating user video source interface server 210) is configured to manage augmented participating user video source interfaces in association with an audio-video conferencing interface service. FIG. 5 illustrates an example augmented participating user video source interface 500 in accordance with example embodiments of the present disclosure. It should be appreciated that the information depicted in the example augmented participating user video source interface 500 is exemplary, and that similar and/or alternative data, parameters, data values, and/or the like may be provided. Additionally or alternatively, in some embodiments, the layout of the various interface elements, and/or sub-interfaces of the depicted augmented participating user video source interface 500 may differ without deviating from scope of this disclosure. As such, the example depicted example augmented participating user video source interface 500, sub-interfaces, elements, and data values depicted therein are provided for descriptive and illustrative purposes and are not to limit the scope or spirit of the disclosure herein.

FIG. 5 illustrates an exemplary augmented participating user video source interface 500 structured in accordance with various embodiments of the present disclosure. In some embodiments, the augmented participating user video source interface 500 is configured for rendering to at least the one of the participating client devices 101A-101N. As illustrated, the augmented participating user video source interface 500 comprises one or more augmented user profile exposure object(s) 510.

The method, apparatus (e.g., augmenting participating user video source interface server 210), and computer program product of an example embodiment will now be described in conjunction with the operations illustrated in FIGS. 6-8. With reference to FIG. 6A, a flowchart is provided broadly illustrating a series of operations or process blocks for managing augmented participating user video source interfaces in association with an audio-video conferencing interface service, in accordance with some example embodiments of the present disclosure. The operations illustrated in FIG. 6A may, for example, be performed by, with the assistance of, and/or under the control of one or more apparatuses, such as augmenting participating user video source interface server 210 and/or truth source application server 175A, as described above. In this regard, performance of the operations may invoke one or more of memory 201, processor 202, input/output circuitry 203, communications circuitry 204, augmenting participating user video source interface circuitry 205, and/or conflict protocol circuitry 206. Certain operations may be considered optional, as indicated by the dashed lines.

As shown in operation 605, the apparatus (e.g., augmenting participating user video source interface server 210) includes means, such as processor 202, input/output circuitry 203, communications circuitry 204, and/or the like, for monitoring an active audio-video conference presentation that is configured for display to participating client devices by an audio-video conferencing interface service. By way of example, prior to or during an active audio-video conference presentation, a user provides the augmenting participating user video source interface server 210 with access to the active audio-video conference presentation. For example, in some embodiments, the user provides the augmenting participating user video source interface server 210 with access by simply providing login credentials and data of the audio-video conferencing interface service to the augmenting participating user video source interface server 210. In some embodiments, the audio-video conferencing interface service communicates with the augmenting participating user video source interface server 210, and vice versa, through one or more application program interfaces (APIs). In some embodiments, the user provides login credentials to the audio-video conferencing interface service, which in turn, provides the augmenting participating user video source interface server 210 with an access code, which can be exchanged for one or more access tokens or other authentication credentials, which are then used by the augmenting participating user video source interface server 210 to access data associated with the active audio-video conference presentation. In some embodiments, the active audio-video conference presentation is a live streaming presentation displayed in real time by the audio-video conferencing interface service to each of the participating client devices. By way of non-limiting example, Anthony, Bob, and Emily are users accessing and participating in a live virtual meeting as it is displayed in real time. Client devices 101A-101N associated with the user identifiers corresponding to Anthony, Bob, and Emily are known as participating client devices.

As shown by operation 610, the apparatus (e.g., augmenting participating user video source interface server 210) includes means, such as processor 202, input/output circuitry 203, communications circuitry 204, augmenting participating user video source interface circuitry 205 and/or the like, for identifying a participating user video source interface for each of the plurality of participating client devices. In some embodiments, each participating user video source interface of the active audio-video conference presentation is associated with a participating user identifier. By way of example, in some embodiments, in association with monitoring an active audio-video conference presentation, the augmenting participating user video source interface server 210 analyzes the plurality of participating user video source interfaces associated with the plurality of participating client devices to identify (e.g., correlate and/or assign) each participating user video source interface to a participating user identifier of the plurality of participating client devices. Additionally or alternatively, in some embodiments, the augmenting participating user video source interface server 210 optionally generates a participant listing object based on the participating user identifiers associated with the identified participating user video source interfaces and transmits the participant listing object to one or more participating client devices of the plurality of participating client devices to cause rendering of a participating user exposure interface to the respective displays of the one or more participating client devices in association with the active audio-video conference presentation. In certain embodiments, the participating user exposure interface comprises a visual representation of a listing of the participating users associated with the active audio-video conference presentation.

Thereafter, as shown by operation 615, the apparatus (e.g., augmenting participating user video source interface server 210) includes means, such as processor 202, input/output circuitry 203, communications circuitry 204, augmenting participating user video source interface circuitry 205 and/or the like, for querying one or more augmenting source user profile repositories to determine an augmenting user profile data structure. In some embodiments, at least one augmenting source user profile repository is an internal augmenting source user profile repository comprising one or more internal augmenting source user profile data structures such that it stores data that is generated based on user input, user selections, and user interaction with the augmented participating user video source interface management system. Additionally or alternatively, in some embodiments, at least one augmenting source user profile repository is an external augmenting source user profile repository that is hosted by an external resource such that it is associated with a third-party controlled system and stores data that is generated based on user input, user selections, and user interaction with such third-party controlled system. In a non-limiting contextual example, user profile data is queried and/or retrieved from such internal augmenting source user profile repositories and/or external augmenting source user profile repositories by the augmenting participating user video source interface server 210.

As shown by operation 620, the apparatus (e.g., augmenting participating user video source interface server 210) optionally includes means, such as processor 202, input/output circuitry 203, communications circuitry 204, augmenting participating user video source interface circuitry 205, conflict protocol circuitry 206, and/or the like, for extracting a user profile parameter subset from one or more augmenting source user profile data structures returned by the query, the extracted user profile parameter subset based on an augmenting user profile exposure template. In some embodiments, the augmenting participating user video source interface server 210 retrieves the augmenting user profile exposure template based on one or more selected identifiers, such as organization identifier, team identifier, and/or participating user identifier. In a non-limiting contextual example, Alice's organization may have an augmenting user profile exposure template prepared in accordance with organization guidelines. In such an embodiment, the augmenting participating user video source interface server 210 retrieves the augmenting user profile exposure template based on an organization identifier associated with the corresponding participating user identifier (e.g., Alice's participating user identifier).

Additionally or alternatively, in some embodiments, the augmenting participating user video source interface server 210 selects and/or retrieves the augmenting user profile exposure template based on a determination of the types of participating user identifiers associated with the monitored active audio-video conference presentation. For example, in some embodiments, the augmenting participating user video source interface server 210 retrieves a first augmenting user profile exposure template in an instance when one or more participating user identifiers associated with the monitored active audio-video conference presentation are determined to not be associated with the same organization identifier as the respective participating user identifier and the augmenting participating user video source interface server 210 retrieves a second, different augmenting user profile exposure template in an instance when all of the participating user identifiers associated with the monitored active audio-video conference presentation are determined to be associated with the same organization identifier as the respective participating user identifier (e.g., an internal active audio-video conference presentation). In a non-limiting contextual example, Alice's organization may have a first augmenting user profile exposure template with selected user profile information for when a meeting includes users from other companies and a second augmenting user profile exposure template (e.g., less formal and/or cull additional information from an internal augmenting source user profile data structure) for when all participants are with the same organization. Other examples include but are not limited to team identifiers and location identifiers.

Additionally or alternatively, in some embodiments, the augmenting participating user video source interface server 210 retrieves an augmenting user profile exposure template set for each participating user identifier. For example, in some embodiments, the augmenting participating user video source interface server 210 retrieves such augmenting user profile exposure template set from an internal augmenting source user profile data structure associated with the participating user identifier. In some embodiments, the augmenting participating user video source interface server 210 causes display of an augmenting user profile exposure template selection interface to the participating client device associated with the participating user identifier, wherein the augmenting user profile exposure template selection interface comprises a rendered listing of available augmenting user profile exposure templates in the augmenting user profile exposure template set. Additionally or alternatively, in some embodiments, each available augmenting user profile exposure template in the rendered listing is configured to be selectable. In still further embodiments, the augmenting participating user video source interface server 210 subsequently receives an augmenting user profile exposure template selection request from the participating client device associated with the participating user identifier. In such embodiments, the selected augmenting user profile exposure template is then used to extract the user profile parameter subset from the one or more augmenting source user profile data structures returned by the query.

Additionally or alternatively, in some embodiments, the augmenting user profile exposure template comprises one or more user profile parameter personalization fields. In such embodiments, determining the augmenting user profile data structure further comprises causing rendering of a personalization augmentation interface to the corresponding participating client device based on the one or more user profile parameter personalization fields and receiving a personalization augmentation selection request. In a non-limiting example, in some embodiments, the personalization augmentation selection request comprises one or more personalized user profile parameters and the corresponding participating user identifier. For example, at least one of the one or more user profile parameter personalization fields is a background personalization field such that a background parameter associated with the augmented participating user video source interface is configurable by the participating user. In a further example, in some embodiments, the personalization augmentation selection request associated with a first participating user identifier comprises a personalized user profile parameter defining the background parameter such that the augmented user profile exposure object associated with the first participating user identifier and transmitted to each of the plurality of participating client devices comprises instructions for modifying a rendering of a visible background of the participating user video source interface associated with the first participating user identifier in accordance with the defined background parameter to cause rendering of the augmented participating user video source interface associated with the first participating user identifier to the respective displays of the plurality of participating client devices in association with the active audio-video conference presentation.

Additionally or alternatively, in some embodiments, the augmenting participating user video source interface server 210 receives an update configured background request from the participating client device associated with the first participating user identifier, wherein the update configured background request modifies the definition of the background parameter. In such embodiments, the augmenting participating user video source interface server 210 updates the augmented user profile exposure object associated with the first participating user identifier as described below with respect to operation 630, in accordance with the modified definition of the background parameter. In such embodiments, augmenting participating user video source interface server 210 thereafter transmits the updated augmented user profile exposure object as described below with respect to operation 635, which comprises instructions for modifying the rendering of the visible background of the participating user video source interface associated with the first participating user identifier in accordance with the modified definition of the background parameter to cause rendering of an updated augmented participating user video source interface associated with the first participating user identifier to the respective displays of the plurality of participating client devices in association with the active audio-video conference presentation.

Thereafter, as shown by operation 625, the apparatus (e.g., augmenting participating user video source interface server 210) optionally includes means, such as processor 202, input/output circuitry 203, communications circuitry 204, augmenting participating user video source interface circuitry 205 and/or the like, for dynamically instantiating the augmenting user profile exposure template with at least the extracted user profile parameter subset by programmatically mapping one or more extracted user profile parameters to one or more augmenting user profile parameter fields in the augmenting user profile exposure template, thereby determining the augmenting user profile data structure. In some embodiments, the determined augmenting user profile data structure comprises one or more of a user name, an organization identifier, a team identifier, a job title identifier, a project identifier, a location identifier, or combinations thereof. In instances wherein the augmenting user profile exposure template comprises one or more augmenting user profile parameter fields, the augmenting participating user video source interface server 210 dynamically instantiates the augmenting user profile exposure template with the extracted user profile parameter subset and the one or more personalized user profile parameters by programmatically mapping the one or more extracted user profile parameters and the one or more personalized user profile parameters to the one or more augmenting user profile parameter fields in the augmenting user profile exposure template, thereby determining the augmenting user profile data structure.

In some embodiments, the user profile data queried and/or retrieved from two or more augmenting source user profile repositories may be disparate such that a comparison by the augmenting participating user video source interface server 210 of two similar types of information, such as user name or job title, reveals a discrepancy. In some embodiments, the augmenting participating user video source interface server 210 selects one of the disparate sources of information to include in the augmenting user profile data structure. Such selection can be accomplished in a myriad of ways, often depending on the available metadata associated with the user profile data. For example, in some embodiments, the determination of the augmenting user profile data structure is made according to a predetermined hierarchy or order of augmenting source user profile repositories, (e.g., user profile data retrieved from an internal augmenting source user profile repository is selected over disparate user profile data originating from an external augmenting source user profile repository). Additionally or alternatively, in some embodiments, determining the disparate user profile data entry to include in the augmenting user profile data structure includes determining the disparate user profile data entry associated with the most recent timestamp or the like.

As shown by operation 630, the apparatus (e.g., augmenting participating user video source interface server 210) includes means, such as processor 202, input/output circuitry 203, communications circuitry 204, augmenting participating user video source interface circuitry 205 and/or the like, for generating an augmented user profile exposure object for each participating user identifier based on each respective determined augmenting user profile data structure. In some embodiments, an augmented user profile exposure object comprises display instructions for augmenting the corresponding participating user video source interface with an overlay visual representation of the augmenting user profile data structure. In a non-limiting contextual example, the augmenting user profile data structure for Alice includes her user name, job title, location, and current projects and the augmenting participating user video source interface server 210 generates an augmented user profile exposure object comprises display instructions for augmenting Alice's participating user video source interface with an overlay visual representation of her user name, job title, location, and current projects to be displayed to each of the respective displays of the plurality of participating client devices associated with the active audio-video conference presentation.

Thereafter, as shown by operation 635, the apparatus (e.g., augmenting participating user video source interface server 210) includes means, such as processor 202, input/output circuitry 203, communications circuitry 204, augmenting participating user video source interface circuitry 205 and/or the like, for transmitting each augmented user profile exposure object to the plurality of participating client devices to cause rendering of the augmented participating user video source interfaces to respective displays of the plurality of participating client devices in association with the active audio-video conference presentation. In some embodiments, at least one of the augmented participating user video source interfaces comprises a visual rendering of one or more of a user name, an organization title, a team name, a job title, a project name, a user location, or combinations thereof associated with the respective participating user. Additionally or alternatively, at least one of the augmented participating user video source interfaces comprises an overlay visual representation of the corresponding participating user identifier. For example, the augmented participating user video source interface may comprise a picture (e.g., profile picture) or drawing associated with the corresponding participating user identifier.

Additionally or alternatively, in some embodiments, at least one of the augmented participating user video source interfaces comprises a selectable link. For example, in some embodiments, the selectable link corresponds to a URL associated with the augmenting source user profile repository from which at least some of the displayed user profile data was retrieved and/or extracted. In a non-limiting contextual example, at least one displayed user profile data item in Alice's augmented participating user video source interface was retrieved/extracted from an external augmenting source user profile repository (e.g., LinkedIn®, Facebook®, Instragram®, and/or other third-party websites) that is hosted by an external resource controlled by a third-party controlled system. In such example, Alice's augmented participating user video source interfaces further comprises a selectable link that directs the other users to the third-party controlled system.

Additionally or alternatively, in some embodiments, at least one of the participating user video source interfaces is not associated with a video source feed. In such embodiments, the augmenting participating user video source interface server 210 is still capable of generating an augmented user profile exposure object for such participating user video source interface and transmitting the augmented user profile exposure object to the plurality of participating client devices to cause rendering of an augmented participating user video source interface. For example, although the video source feed may be blank (e.g., a black screen), the augmented participating user video source interface includes an overlay representation of the augmented user profile exposure object in accordance with the disclosure herein.

FIG. 6B is a signal diagram of an example data flow represented by the operations depicted in FIG. 6A. That is, FIG. 6B illustrates an example signal diagram illustrating data flow interactions between an augmenting participating user video source interface server, a client device, and a repository, when managing an augmented participating user video source interface in accordance with one embodiment. FIG. 6B is described as being performed by an augmenting participating user video source interface server 210, an augmenting source user profile repository 115, 215, and a participating client device 101A. These may be similar to those previously discussed with regards to FIG. 1.

Turning now to FIG. 7, a flowchart broadly illustrates another series of operations or process blocks for querying at least one external augmenting source user profile repository in accordance with some example embodiments of the present disclosure. The example operations of FIG. 7 are illustrated from the perspective of an augmented participating user video source interface management system 200. The operations illustrated in FIG. 7 may, for example, be performed by, with the assistance of, and/or under the control of one or more apparatuses, such as augmenting participating user video source interface server 210, as described above. In this regard, performance of the operations may invoke one or more of memory 201, processor 202, input/output circuitry 203, communications circuitry 204, augmenting participating user video source interface circuitry 205, and/or conflict protocol circuitry 206.

As shown in operation 705, the apparatus (e.g., augmenting participating user video source interface server 210) includes means, such as processor 202, input/output circuitry 203, communications circuitry 204, and/or the like, for generating an authentication request based on an internal augmenting source user profile data structure associated with the participating user identifier. For example, at least one internal augmenting source user profile data structure includes information regarding an external augmenting source user profile repository, such as a user name and password associated with such external augmenting source user profile repository. By way of example, prior to or during an active audio-video conference presentation, a user provides the augmenting participating user video source interface server 210 with access to the external augmenting source user profile repository. For example, in some embodiments, the user provides the augmenting participating user video source interface server 210 with access by simply providing login credentials and data of the external augmenting source user profile repository to the augmenting participating user video source interface server 210.

As shown in operation 710, the apparatus (e.g., augmenting participating user video source interface server 210) includes means, such as processor 202, input/output circuitry 203, communications circuitry 204, and/or the like, for transmitting the authentication request to the third-party controlled system.

Thereafter, as shown in operation 715, the apparatus (e.g., augmenting participating user video source interface server 210) includes means, such as processor 202, input/output circuitry 203, communications circuitry 204, and/or the like, for receiving an authentication response from the third-party controlled system. For example, in some embodiments, the authentication response comprises an authentication approval, and the augmenting participating user video source interface server 210 retrieves an augmenting source user profile data structure associated with the participating user identifier from the external augmenting source user profile repository. In some embodiments, the external augmenting source user profile repository communicates with the augmenting participating user video source interface server 210, and vice versa, through one or more application program interfaces (APIs). In some embodiments, the user provides login credentials to the at least one external augmenting source user profile repository, which in turn, provides the augmenting participating user video source interface server 210 with an access code, which can be exchanged for one or more access tokens or other authentication credentials, which are then used by the augmenting participating user video source interface server 210 to access data associated with the external augmenting source user profile repository.

In some embodiments, the authentication response comprises an authentication disapproval or an authentication error. For example, if the provided login credentials are wrong or expired, the augmenting participating user video source interface server 210 may receive an authentication disapproval or an authentication error. In such embodiments, the augmenting participating user video source interface server 210 transmits an authentication error notification object to the participating client device associated with the participating user identifier to cause rendering of an authentication error notification to the display of the corresponding participating client device, and in in some instances, enabling the user to attempt to correct the error or otherwise overcome the authentication disapproval.

With reference to FIG. 8, a flowchart is provided broadly illustrating a series of operations or process blocks for managing augmented participating user video source interfaces in association with an audio-video conferencing interface service and a truth source application, in accordance with some example embodiments of the present disclosure. The operations illustrated in FIG. 8 may, for example, be performed by, with the assistance of, and/or under the control of one or more apparatuses, such as augmenting participating user video source interface server 210 and/or truth source application server 175A, as described above. In this regard, performance of the operations may invoke one or more of memory 201, 401, processor 202, 402, input/output circuitry 203, 403, communications circuitry 204, 404, augmenting participating user video source interface circuitry 205, and/or conflict protocol circuitry 206, 406. Certain operations may be considered optional, as indicated by the dashed lines.

As shown in operation 805, the apparatus (e.g., augmenting participating user video source interface server 210) includes means, such as processor 202, input/output circuitry 203, communications circuitry 204, and/or the like, for monitoring an active audio-video conference presentation that is configured for display to participating client devices by an audio-video conferencing interface service. By way of example, prior to or during an active audio-video conference presentation, a user provides the augmenting participating user video source interface server 210 with access to the active audio-video conference presentation. For example, in some embodiments, the user provides the augmenting participating user video source interface server 210 with access by simply providing login credentials and data of the audio-video conferencing interface service to the augmenting participating user video source interface server 210. In some embodiments, the audio-video conferencing interface service communicates with the augmenting participating user video source interface server 210, and vice versa, through one or more application program interfaces (APIs). In some embodiments, the user provides login credentials to the audio-video conferencing interface service, which in turn, provides the augmenting participating user video source interface server 210 with an access code, which can be exchanged for one or more access tokens or other authentication credentials, which are then used by the augmenting participating user video source interface server 210 to access data associated with the active audio-video conference presentation. In some embodiments, the active audio-video conference presentation is a live streaming presentation displayed in real time by the audio-video conferencing interface service to each of the participating client devices.

As shown by operation 810, the apparatus (e.g., augmenting participating user video source interface server 210) includes means, such as processor 202, input/output circuitry 203, communications circuitry 204, augmenting participating user video source interface circuitry 205 and/or the like, for identifying a participating user video source interface for each of the plurality of participating client devices. By way of example, in some embodiments, in association with monitoring an active audio-video conference presentation, the augmenting participating user video source interface server 210 analyzes the plurality of participating user video source interfaces associated with the plurality of participating client devices to identify (e.g., correlate and/or assign) each participating user video source interface to a participating user identifier of the plurality of participating client devices.

Thereafter, as shown by operation 815, the apparatus (e.g., augmenting participating user video source interface server 210) includes means, such as processor 202, input/output circuitry 203, communications circuitry 204, augmenting participating user video source interface circuitry 205 and/or the like, for optionally determining whether a truth source application is installed on a participating client device. In some embodiments, for example, the participating client device transmits, and the augmenting participating user video source interface server 210 receives, a truth source application status notification. In an example embodiment, the application status notification comprises an installation status value of INSTALLED or NOT INSTALLED. The participating client device, in some embodiments, determines such installation status value by querying an operating system of the participating client device for an instance of the truth source application.

In some embodiments wherein it is determined that the truth source application is installed on a participating client device, the truth source application optionally comprises a real time location identifier. For example, in some embodiments, the real time location identifier is based on GPS location data of the corresponding participating client device on which the truth source application is installed. Additionally or alternatively, in some embodiment, the augmenting user profile data structure optionally comprises the real time location identifier such that the augmented participating user video source interface comprises a real time location of the corresponding participating client device. In still further embodiments, the augmenting user profile data structure optionally comprises the real time location identifier such that the augmented participating user video source interface renders a real time location of the corresponding participating client device.

Additionally or alternatively, in some embodiments, it may not be necessary to determine whether a truth source application is installed on a participating client device. For example, in certain embodiments wherein the truth source application is a directory service, the apparatus (e.g., augmenting participating user video source interface server 210) includes means, such as processor 202, input/output circuitry 203, communications circuitry 204, augmenting participating user video source interface circuitry 205, conflict protocol circuitry 206, and/or the like, for transmitting a request to the truth source application (e.g., a directory service executing on and/or in association with truth source application server 175A), such request to determine whether a truth source account associated with the participating user identifier of the corresponding participating client device has been registered with, assigned to, and/or otherwise associated with a truth source account. In still further embodiments, the user may have granted the truth source account access to GPS location data associated with the corresponding participating client device. In such embodiments, the truth source account may receive notifications (e.g., scheduled, manually, randomly, etc.) from the corresponding participating client device, such notifications enclosing such GPS location data.

Turning to operation 820, the apparatus (e.g., augmenting participating user video source interface server 210 and/or truth source application server 175A) includes means, such as processor 202, input/output circuitry 203, communications circuitry 204, augmenting participating user video source interface circuitry 205, conflict protocol circuitry 206, 406, and/or the like, for accessing a truth source account associated with the truth source application. In preferred embodiments, the truth source application is communicably coupled to an organization personnel onboarding repository. Additionally or alternatively, in some embodiments, the truth source account optionally comprises an established communication channel with at least one external augmenting source user profile repository that is hosted by an external resource such that it is associated with a third-party controlled system. In such embodiments, establishing the communication channel between the truth source account and the external augmenting source user profile repository comprises generating an authentication request based on user-provided credentials associated with the participating user identifier, the truth source account comprising the user-provided credentials, transmitting the authentication request to the third-party controlled system, and receiving an authentication response from the third-party controlled system, wherein in an instance the authentication response comprises an authentication approval, retrieving an augmenting source user profile data structure associated with the participating user identifier from the external augmenting source user profile repository, and wherein in an instance the authentication response comprises an authentication disapproval or an authentication error, transmitting an authentication error notification object to the participating client device associated with the participating user identifier to cause rendering of an authentication error notification to the display of the corresponding participating client device.

Returning to the truth source application, in some embodiments, the truth source application (e.g., truth source application server 175A includes means, such as processor 402, input/output circuitry 403, communications circuitry 404, conflict protocol circuitry 406, and/or the like) is configured to apply a conflict protocol to identify an accurate user profile parameter subset in an instance wherein the external augmenting source user profile repository comprises potentially conflicting user profile parameter data as compared to user profile parameter data of the organization personnel onboarding repository. For example, in a non-limiting embodiment, applying the conflict protocol comprises automatically identifying the user profile parameter data of the organization personnel onboarding repository source application as the accurate user profile parameter subset. The conflict protocol circuitry generates and/or assigns a priority hierarchy with a plurality of data sources (e.g., third party data sources). Additionally or alternatively, applying the conflict protocol comprises identifying the user profile parameter data associated with the most recent timestamp as the accurate user profile parameter subset. In still further embodiment, it is optionally contemplated that applying the conflict protocol comprises propagating a modal (e.g., a user interface component) to the participating client device associated with the truth source account, the modal requesting a selection from the user to identify an accurate user profile parameter subset.

With further reference to operation 820, the apparatus (e.g., augmenting participating user video source interface server 210 and/or truth source application server 175A) includes means, such as processor 202, input/output circuitry 203, communications circuitry 204, augmenting participating user video source interface circuitry 205, conflict protocol circuitry 206, 406, and/or the like, for determining a corresponding augmenting user profile data structure based on the truth source account in a circumstance where the truth source application is determined to be installed on a participating client device. In some embodiments, an augmenting user profile data structure comprises one or more of a user name, an organization identifier, a team identifier, a job title identifier, a project identifier, a location identifier, or combinations thereof.

In some embodiments, determining an augmenting user profile data structure based on the truth source account may comprise extracting a user profile parameter subset from the truth source account based on an augmenting user profile exposure template. In some embodiments, the apparatus (e.g., augmenting participating user video source interface server 210 and/or truth source application server 175A) includes means, such as processor 202, input/output circuitry 203, communications circuitry 204, augmenting participating user video source interface circuitry 205, conflict protocol circuitry 206, 406, and/or the like for programmatically identifying and retrieving the augmenting user profile exposure template based on an analysis of the participating user identifiers. For example, in some embodiment, in an instance wherein at least one of the participating user identifiers is associated with an organization identifier that differs from another organization identifier of another participating user identifier, an external facing augmenting user profile exposure template is programmatically identified. Additionally or alternatively, in an instance wherein each of the participating user identifiers is associated with a same organization identifier, an internal facing augmenting user profile exposure template is programmatically identified.

Additionally or alternatively, in some embodiments, the apparatus (e.g., augmenting participating user video source interface server 210) includes means, such as processor 202, input/output circuitry 203, communications circuitry 204, augmenting participating user video source interface circuitry 205, conflict protocol circuitry 206, and/or the like for transmitting a request for participating user identifier composition to the audio-video conferencing interface service and further receiving a notification from the audio-video conferencing interface service, the notification indicative of whether one or more participating user identifiers is associated with a different organization than any other participating user identifier (i.e., at least one participant is a third-party). The apparatus (e.g., augmenting participating user video source interface server 210 and/or truth source application server 175A) further includes means, such as processor 202, input/output circuitry 203, communications circuitry 204, augmenting participating user video source interface circuitry 205, conflict protocol circuitry 206, 406, and/or the like for retrieving the augmenting user profile exposure template based on the received notification.

Once the user profile parameter subset is extracted from the truth source account, the apparatus (e.g., augmenting participating user video source interface server 210 and/or truth source application server 175A) includes means, such as processor 202, input/output circuitry 203, communications circuitry 204, augmenting participating user video source interface circuitry 205, conflict protocol circuitry 206, 406, and/or the like for dynamically instantiating the augmenting user profile exposure template with at least the extracted user profile parameter subset by programmatically mapping one or more extracted user profile parameters to one or more augmenting user profile parameter fields in the augmenting user profile exposure template, thereby determining the augmenting user profile data structure.

Thereafter, as shown in operation 825, the apparatus (e.g., augmenting participating user video source interface server 210) includes means, such as processor 202, input/output circuitry 203, communications circuitry 204, augmenting participating user video source interface circuitry 205 and/or the like, for generating an augmented user profile exposure object based on each respective determined augmenting user profile data structure. In some embodiments, an augmented user profile exposure object comprises display instructions for augmenting the corresponding participating user video source interface with an overlay visual representation of the augmenting user profile data structure.

Thereafter, as shown in operation 830, the apparatus (e.g., augmenting participating user video source interface server 210) includes means, such as processor 202, input/output circuitry 203, communications circuitry 204, augmenting participating user video source interface circuitry 205 and/or the like, for propagating each augmented user profile exposure object to the audio-video conferencing interface service to cause rendering of the augmented participating user video source interfaces to respective displays of the plurality of participating client devices in association with the active audio-video conference presentation. In some embodiments, at least one of the augmented participating user video source interfaces comprises a visual rendering of one or more of a user name, an organization title, a team name, a job title, a project name, a user location, or combinations thereof associated with the respective participating user. Additionally or alternatively, at least one of the augmented participating user video source interfaces comprises an overlay visual representation of the corresponding participating user identifier. For example, the augmented participating user video source interface may comprise a picture (e.g., profile picture) or drawing associated with the corresponding participating user identifier. Additionally or alternatively, the apparatus (e.g., augmenting participating user video source interface server 210) includes means, such as processor 202, input/output circuitry 203, communications circuitry 204, augmenting participating user video source interface circuitry 205 and/or the like, for propagating each augmented user profile exposure object to the plurality of participating client devices to cause rendering of the augmented participating user video source interfaces to respective displays of the plurality of participating client devices in association with the active audio-video conference presentation. Additionally or alternatively, the apparatus (e.g., augmenting participating user video source interface server 210) includes means, such as processor 202, input/output circuitry 203, communications circuitry 204, augmenting participating user video source interface circuitry 205 and/or the like, for removing and/or causing the rendering of the augmented participating user video source interfaces to respective displays of the plurality of participating client devices to stop rendering in one or more instances. In some embodiments, the augmenting participating user video source interface server 210 removes the augmented participating user video source interfaces and/or sends a request to the audio-video conferencing interface service to stop rendering the augmented participating user video source interface. For example, while monitoring the active audio-video conference presentation, the augmenting participating user video source interface server 210 may cause the rendering of the augmented participating user video source interfaces to stop rendering when the augmenting participating user video source interface server 210 detects that the active audio-video conference presentation has ended or expired. In another embodiment, the augmenting participating user video source interface server 210 may cause the rendering of the augmented participating user video source interfaces to stop rendering upon expiration of a threshold amount of time. Such functionality may improve privacy issues or concerns with outdated or past augmented participating user video source interfaces being rendered in future audio-video conference presentations.

FIGS. 6A, 6B, 7, and 8 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the augmenting participating user video source interface server 210 and executed by a processor 202 of the augmenting participating user video source interface server 210. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system configured to manage augmented participating user video source interfaces in association with an audio-video conferencing interface service, the system comprising at least one processor and at least one memory, the at least one memory having computer-coded instructions therein, wherein the computer-coded instructions are configured to, in execution with the at least one processor, cause the system to:

monitor an active audio-video conference presentation that is configured for rendering to respective displays of a plurality of participating client devices by the audio-video conferencing interface service;

identify a participating user video source interface for at least a first participating client device of the plurality of participating client devices;

determine whether a truth source application is installed on the first participating client device;

in a circumstance where the truth source application is determined to be installed on the first participating client device, access a truth source account associated with the truth source application and determine a first augmenting user profile data structure, wherein the truth source application is configured to apply a conflict protocol to identify accurate user profile parameter data from which the first augmenting user profile data structure is determined in an instance wherein a first augmenting source user profile repository contains potentially conflicting user profile parameter data compared to a second augmenting source user profile repository;

generate a first augmented user profile exposure object based on the first augmenting user profile data structure; and propagate the first augmented user profile exposure object to at least other participating client devices of the plurality of participating client devices to cause rendering of a first augmented participating user video source interface to the respective displays of the other participating client devices of the plurality of participating client devices in association with the active audio-video conference presentation.

2. The system of claim 1, wherein the first augmenting user profile data structure comprises one or more of a user name, an organization identifier, a team identifier, a job title identifier, a project identifier, a location identifier, or combinations thereof.

3. The system of claim 1, wherein determining the first augmenting user profile data structure based on the truth source account comprises:
based on an augmenting user profile exposure template, extracting a user profile parameter subset from the truth source account; and
dynamically instantiating the augmenting user profile exposure template with at least the extracted user profile parameter subset by programmatically mapping one or more extracted user profile parameters to one or more augmenting user profile parameter fields in the augmenting user profile exposure template, thereby determining the first augmenting user profile data structure.

4. The system of claim 3, wherein each participating client device is associated with a corresponding participating user identifier and wherein the computer-coded instructions are further configured to, in execution with the at least one processor, cause the system to:
for each corresponding participating user identifier, retrieve an augmenting user profile exposure template set;
cause display of an augmenting user profile exposure template selection interface to the participating client device associated with the corresponding participating user identifier, wherein the augmenting user profile exposure template selection interface comprises a rendered listing of available augmenting user profile exposure templates in the augmenting user profile exposure template set, and wherein each available augmenting user profile exposure template in the rendered listing is configured to be selectable; and
receive an augmenting user profile exposure template selection request from the participating client device associated with the corresponding participating user identifier.

5. The system of claim 4, wherein the augmenting user profile exposure template set is retrieved from an internal augmenting source user profile data structure associated with the corresponding participating user identifier.

6. The system of claim 3, wherein each participating client device is associated with a corresponding participating user identifier and wherein the computer-coded instructions are further configured to, in execution with the at least one processor, cause the system to:
retrieve the augmenting user profile exposure template based on an organization identifier associated with the corresponding participating user identifier.

7. The system of claim 3, wherein each participating client device is associated with a corresponding participating user identifier and wherein the computer-coded instructions are further configured to, in execution with the at least one processor, cause the system to:
programmatically identify and retrieve the augmenting user profile exposure template based on an analysis of the corresponding participating user identifiers.

8. The system of claim 7, wherein at least one of the corresponding participating user identifiers is associated with an organization identifier that differs from another organization identifier of another corresponding participating user identifier such that an external facing augmenting user profile exposure template is programmatically identified.

9. The system of claim 7, wherein each of the corresponding participating user identifiers is associated with a same organization identifier such that an internal facing augmenting user profile exposure template is programmatically identified.

10. The system of claim 1, wherein the truth source account comprises an established communication channel with at least one external augmenting source user profile repository that is hosted by an external resource such that it is associated with a third-party controlled system.

11. The system of claim 10, wherein establishing the communication channel between the truth source account and the external augmenting source user profile repository comprises:
generating an authentication request based on user-provided credentials associated with a first participating user identifier corresponding to the first participating client device, the truth source account comprising the user-provided credentials;
transmitting the authentication request to the third-party controlled system; and
receiving an authentication response from the third-party controlled system,
wherein in an instance the authentication response comprises an authentication approval, retrieving an augmenting source user profile data structure associated with the first participating user identifier from the external augmenting source user profile repository, and
wherein in an instance the authentication response comprises an authentication disapproval or an authentication error, transmitting an authentication error notification object to the first participating client device to cause rendering of an authentication error notification to the display of the first participating client device.

12. The system of claim 10, wherein the truth source application is communicably coupled to an organization personnel onboarding repository.

13. The system of claim 12, wherein the first augmenting source user profile repository is the external augmenting source user profile repository and the second augmenting source user profile repository is the organization personnel onboarding repository such that the truth source application is configured to apply the conflict protocol to identify accurate user profile parameter data in an instance wherein the external augmenting source user profile repository comprises potentially conflicting user profile parameter data as compared to user profile parameter data of the organization personnel onboarding repository.

14. The system of claim 13, wherein applying the conflict protocol comprises automatically identifying the user profile parameter data of the organization personnel onboarding repository as an accurate user profile parameter subset.

15. The system of claim 13, wherein applying the conflict protocol comprises identifying the user profile parameter data associated with a most recent timestamp as an accurate user profile parameter subset.

16. The system of claim 13, wherein applying the conflict protocol comprises propagating a modal to the display of the first participating client device associated with the truth source account, the modal requesting a selection from the user of the first participating client device to identify an accurate user profile parameter subset.

17. The system of claim 1, wherein the truth source application comprises a real time location identifier, the real time location identifier based on GPS location data of the first participating client device.

18. The system of claim 17, wherein the first augmenting user profile data structure comprises the real time location identifier such that the first augmented participating user video source interface comprises a real time location of the first participating client device.

19. The system of claim 1, wherein the first augmenting user profile data structure comprises a real time location identifier such that the first augmented participating user video source interface renders a real time location of the first participating client device.

20. A computer-implemented method for managing augmented participating user video source interfaces in association with an audio-video conferencing interface service, the method comprising:

monitoring an active audio-video conference presentation that is configured for rendering to respective displays of a plurality of participating client devices by the audio-video conferencing interface service;

identifying a participating user video source interface for at least a first participating client device of the plurality of participating client devices;

determining whether a truth source application is installed on the first participating client device;

in a circumstance where the truth source application is determined to be installed on the first participating client device, accessing a truth source account associated with the truth source application and determining a first augmenting user profile data structure, wherein the truth source application is configured to apply a conflict protocol to identify accurate user profile parameter data from which the first augmenting user profile data structure is determined in an instance wherein a first augmenting source user profile repository contains potentially conflicting user profile parameter data compared to a second augmenting source user profile repository;

generating a first augmented user profile exposure object based on the first augmenting user profile data structure; and propagating the first augmented user profile exposure object to at least other participating client devices of the plurality of participating client devices to cause rendering of a first augmented participating user video source interface to the respective displays of the other participating client devices of the plurality of participating client devices in association with the active audio-video conference presentation.

* * * * *